US010481479B2

(12) United States Patent
Maynard

(10) Patent No.: US 10,481,479 B2
(45) Date of Patent: Nov. 19, 2019

(54) IMMERSIVE OPTICAL PROJECTION SYSTEM

(71) Applicant: Ronald S. Maynard, Austin, TX (US)

(72) Inventor: Ronald S. Maynard, Austin, TX (US)

( * ) Notice: Subject to any disclaimer, the term of this patent is extended or adjusted under 35 U.S.C. 154(b) by 0 days.

(21) Appl. No.: 15/716,503

(22) Filed: Sep. 26, 2017

(65) Prior Publication Data

US 2019/0025688 A1 Jan. 24, 2019

Related U.S. Application Data

(60) Provisional application No. 62/399,530, filed on Sep. 26, 2016.

(51) Int. Cl.
*G03B 21/28* (2006.01)
*G02B 5/12* (2006.01)
(Continued)

(52) U.S. Cl.
CPC .............. *G03B 21/28* (2013.01); *G02B 5/12* (2013.01); *G02B 26/12* (2013.01);
(Continued)

(58) Field of Classification Search
CPC .... G03B 21/005; G03B 21/008; G03B 21/28; G03B 21/145; G03B 21/2013;
(Continued)

(56) References Cited

U.S. PATENT DOCUMENTS

2008/0002161 A1* 1/2008 Streid ................... G03B 21/32
353/98
2016/0327797 A1* 11/2016 Bailey ................ G02B 27/0172
(Continued)

*Primary Examiner* — Sultan Chowdhury

(57) ABSTRACT

An improved virtual reality system comprising an immersive sound system, sensors, a power source, communications, data processing, and an optical system that delivers photoreceptor density resolution, wide angle, high contrast, binocular vision, continuous depth of field images, is integrated for a fully immersive experience. In one embodiment, an optical system comprises a miniaturized array of projectors geometrically arranged to cover the photoreceptive areas of the retina. The projectors provide full spectrum, amplitude modulated, and controllably divergent beams of light that can be steered with one or more degrees of freedom. These beams are subsequently reflected off a compound curved reflector, through additional optics, and along reversible light paths to form images on the retina. Segmented projector arrays greatly improve dynamic performance. In another embodiment, an adaptive optics reflector is comprised of an array of fixed, or independently controllable optical elements, that can alter reflected beam properties such that a virtual object may appear to be nearer to, or further from the viewer. In yet another embodiment, a direct projection, two dimensional array of micro projectors are positioned to deliver a fully immersive image directly into the eye. Binocular embodiments can elicit an accurate vergence-accommodation reflex, produce stabilized images that are closely synchronized with the vestibulo-ocular reflex, and create lifelike binocular disparities that produce a faithful sense of stereopsis, an important factor for the avoidance of virtual reality motion sickness.

20 Claims, 25 Drawing Sheets

(51) Int. Cl.
  *H04N 9/31* (2006.01)
  *G02B 27/01* (2006.01)
  *G02B 26/12* (2006.01)
  *G02B 27/00* (2006.01)
  *G06F 3/01* (2006.01)
  *H04R 1/02* (2006.01)
  *G02B 1/00* (2006.01)
  *G02B 26/08* (2006.01)

(52) U.S. Cl.
  CPC ..... *G02B 27/0037* (2013.01); *G02B 27/0172* (2013.01); *G02B 27/0176* (2013.01); *G06F 3/013* (2013.01); *H04N 9/3129* (2013.01); *H04N 9/3147* (2013.01); *H04R 1/025* (2013.01); *G02B 1/002* (2013.01); *G02B 26/0825* (2013.01); *G02B 26/0841* (2013.01); *G02B 2027/0178* (2013.01); *G02B 2027/0187* (2013.01)

(58) Field of Classification Search
  CPC .... G03B 21/2033; G02B 26/10; G02B 26/12; G02B 26/101; G02B 26/103; G02B 26/105; G02B 26/106; G02B 27/01; G02B 27/017; G02B 27/0037; G02B 27/0101; G02B 27/0172; G02B 27/0176
  See application file for complete search history.

(56) References Cited

U.S. PATENT DOCUMENTS

2016/0356984 A1* 12/2016 Horie ................ G02B 26/0858
2017/0351099 A1* 12/2017 Ukai ..................... B60K 35/00

* cited by examiner

IMMERSIVE OPTICAL PROJECTION SYSTEM

CROSS-REFERENCE TO RELATED APPLICATIONS

This patent application claims the benefit of U.S. provisional patent application Ser. No. 62/399,530, filed on the 26 Sep. 2016 by the present inventor.

TECHNICAL FIELD

The present disclosure relates to a virtual reality system that in one case, provides a photoreceptor density limiting, wide angle, full spectrum, binocular vision, real optical depth of field, imaging system in a head mounted form factor.

BACKGROUND ART

Many devices have been created to deliver optical information to the human eye. Visual information can take the form of high definition video, computer generated content, two and three dimensional content, text, etc. The visual component of a virtual reality system delivers synthetic content directly to the eye, whereas augmented reality systems blend generated content with real world views.

In nature, every illuminated particle reflects or emits rays of light in every direction and in a multitude of wavelengths. The rays that reach us from afar are nearly parallel and those that arrive from a nearby point are more divergent. The arriving beams that pass through our pupils are focused, or made more convergent, as they pass through the cornea, the aqueous humor, the crystalline lens, the vitreous humor and finally, arrive at the retina.

For normal vision, an image will be formed on a portion of the retina that is dependent on the entrance angle of the beam with respect to the optical axis of the eye, or direction of gaze. Those images that form in the central 2 degrees of vision fall on an area of the retina with an exceptionally high density of photoreceptor cells called the fovea. It is here that most of the high resolution visual information is converted from optical to electrical nerve impulses via the photoreceptors, and transmitted to the visual cortex via the optic nerve bundle. Photoreceptors further away from the fovea detect off axis images and contribute to the sense of peripheral vision. In total, there are approximately 15 million rod cell and cone cell photoreceptors. Rod cells detect low levels of light, but no color, and cone cells detect color, but at higher levels of light intensity. Three types of cone cells sensitive to red green and blue light, are predominantly found in the high density central area of the retina, thereby providing high resolution color vision.

Because central vision contains so much more information, the eye will rapidly "scan" or saccade when fixating on an important target, say a face or moving object, and jump to another at a rate of up to 1000 Hz. The eye can also "jitter" or micro saccade to provide continuous sensitization to the retina. The eye can rotate up/down and left/right about a central point at a speed of up to 900 degrees per minute. Although the eye can rotate in excess of 50 degrees in various directions, depending upon age, individuals rarely exhibit eye motions exceeding plus or minus 10 degrees from a straight ahead gaze.

An eye, with a fixed forward gaze, can detect light impinging on the cornea from and angle of nearly 110 degrees towards the temple, and about 59 degrees towards the nose. The field of vision also extends to approximately 56 degrees above and 70 degrees below the direction of gaze.

Monocular vision can provide moderate depth of field cues through motion parallax, kinetic rotations, shadows, familiar size, occultation, perspective, and accommodation or focus, to name a few.

Binocular vision allows for a wider field of view, improves acuity due to detail averaging between two images and provides visual cues for a much stronger sense of 3D depth perception. The primary binocular cues are stereopsis and the vergence-accommodation reflex. Stereopsis gives a sense of depth by processing slightly different left and right images that fall on the retinas. Although both eyes may converge on the same point of a 3D object, if that object is closer than 10 meters, then its shape, volume and shadows, having points nearer and further than the point of convergence, will project to slightly different horizontal positions on each retina. This slight, horizontal differential displacement, or "binocular disparity", is due to the horizontal parallax induced by eye separation, and is sensed by dedicated cells called "binocular cells", that are horizontally arranged near the center of vision. While vertical displacements due to shapes and shadows alone are also perceived, they are less impactful. All disparity information is then sent to the visual cortex, where the two images are fused as one, and some measure of depth is realized. A relative, rather than an absolute depth may be sensed in this way.

For objects closer than 2 meters, precise depth information is extracted via the vergence-accommodation reflex. For a close object, an approximate estimation of distance is perceived by stereopsis, thereby triggering an involuntary, simultaneous occurrence of three events; the eyes converge to a point of fixation on the object, the ciliary muscles contract which thickens the crystalline lens and increases its focusing power, and the pupils constrict, which improves the depth of focus. An increase in focusing power brings the more divergent rays of a close object to a sharp focus on the retina. The amount of effort to achieve a good focus is observed by the proprioceptive sensors of the ciliary process, and is relayed to the visual cortex that derives a precise interpretation of focal distance. Similarly, kinesthetic information from the extraocular muscles that moved the eyes into a specific angle of convergence, coupled with a gaze angle, allows the visual cortex to extract a very precise distance via triangulation.

Finally, the vestibulo-ocular reflex is an interaction between the vestibular system that provides balance, spatial orientation and acceleration information, and the extraocular muscles that move the eyes about three axes of rotation. A movement of the head in one direction causes a reflexive counter move of the eyes in the opposite direction, thereby maintaining a stable image at the center of the visual field. This allows for fixed targeting of a stationary object during body motion or stable targeting of a moving object.

A typical movie projector produces a focused image on a curved or flat screen at a distance. A curved screen helps to improve the sense of immersion with a modest increase in peripheral vision. In both cases, the distant screen provides reflected parallel light beams that can easily be focused by the human eye, but lends little parallax or binocular information.

Viewing a distant screen with "3D" glasses can provide a sense of depth. These devices utilize various techniques to deliver a slightly different view angle to each eye. Most are limited by frame rate, brightness, and the production of a truly divergent ray field that a near object would produce.

And of course, they are all subject to the flat field, limited resolution, limited dynamic range and limited angular extent of the distant screen. An improvement in field of view occurs when moving a screen closer while using 3D glasses. Although closer, the depth of focus remains constant and relaxed distant focus is lost. The field of view is also a small subset of the visual potential.

Additional information content can be added by a "heads up" display whereby information is projected on the surface of a visor or screen. Using a combination of scanners and optical elements, a virtual image can be produced at any apparent depth, but is usually limited by a narrow angle of view. Such information may overlay the true visual field. The overlay of a computer generated, or other video source on a true direct view of a scene falls in the realm of augmented reality.

Current Virtual Reality, Augmented Reality, and Mixed Reality systems attempt to provide a multitude of visual cues, including motion stabilized imaging, binocular vision, and a few discrete focal planes to give a better sense of realism. Most provide a modest field of view, and are limited in delivering continuous, truly divergent fields that are ubiquitous in the real world. These head mounted systems often have a bulky form factor, and are hard wired to a power source, a data processing unit, or a personal computer. More advanced models move image processing, wireless communications, and battery power onto the headset. A number of devices also incorporate motion sensors, outward looking cameras, external sensors to track one's movements, and inward looking cameras to track eye position. Recent mobile VR/AR/MR offerings have raised social concerns about privacy and obtrusiveness.

Prior art teaches many methods for determining the position of the pupil relative to the head. A commonly used form of gaze sensor consists of a remote or head mounted source of Infra-Red light that is projected towards the eye and a remote or head mounted camera that can observe the pupil position or the resulting reflection patterns from the cornea.

AR systems also suffer from limited control of the lighting environment. The real scene is directly passed through to the observer via a transparent screen and synthetic images are then overlaid on that scene. It is generally an additive process yielding translucent images. A problem occurs when attempting to overlay a dark simulated object onto a bright real background. When a beachgoer gazes through an AR headset and looks to the bright horizon, it is not possible to observe the overlay of a black containership. Nor is it possible to accurately control shadows.

In general, current devices are hampered by their inability to sufficiently synchronize precise head motions with stabilized imagery, producing a disturbing visual lag. This can be attributed, in part, to sensor deadband issues, software computation delays, digital content protection, and LCD switching speeds. What is observed does not agree with what motion, if any, is sensed by the vestibular system. Further, stereopsis cannot be fully achieved unless a true 3D image is presented to the eyes. In addition, virtual systems that do not synchronize binocular vision with natural depth of field cues create a vergence-accommodation conflict. All of these sensory conflicts can negatively affect the human vestibular and ocular systems resulting in disorientation and what is termed "virtual reality sickness".

Finally, systems that lack eye tracking capabilities are incapable of dynamic data allocation that can efficiently address the greater needs of central vision. Thus, systems of this type uniformly distribute their data bandwidth over the entire visual field requiring a greater computational load for a given resolution.

SUMMARY

In one embodiment, an improved virtual, augmented, or mixed reality total immersion system employs an optical system that delivers stimulation to the millions of rod and cone receptors of the retina in a way that can elicit an accurate vergence-accommodation reflex, produces stabilized images that are closely synchronized with the vestibulo-ocular reflex, creates lifelike binocular disparities that produce a faithful sense of stereopsis, and provides for a large color space and a physiological full field of view. A further enhanced embodiment may include immersive audio, a power source, additional environmental sensors, position sensors, motion sensors, inward and outward looking cameras or scanners, high speed data processing, communications, and can reduce manufacturing costs, be robust, have an attractive form factor, and have the ability to selectively deliver increased bandwidth and resolution to the central field of vision.

DESCRIPTION OF EMBODIMENTS

Figure 1:
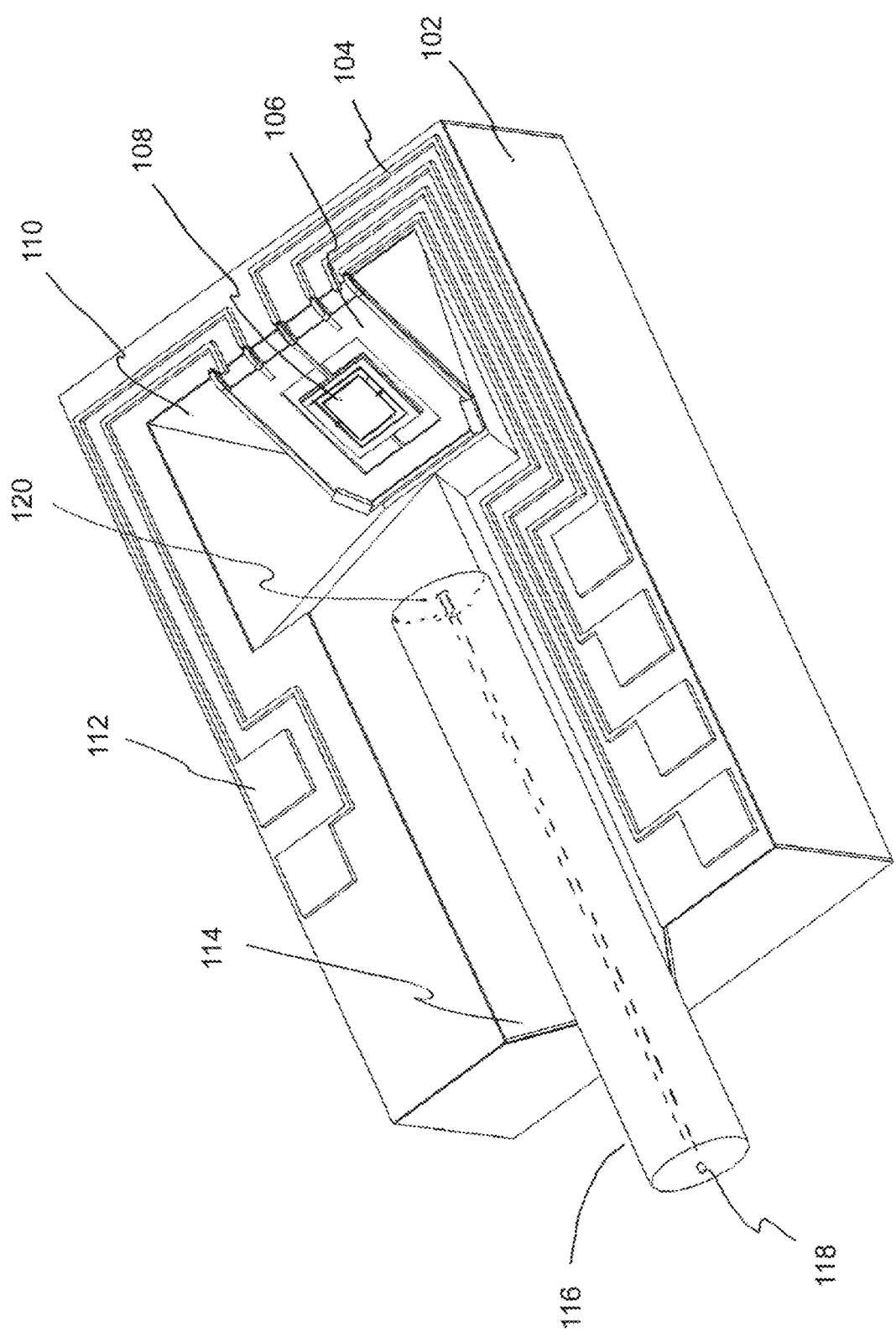
FIG. 1—Example of a Monolithically Micromachined Beam Steering Device
FIG. 2—Divergent Micro Lens
FIG. 3—Two Degree of Freedom Optical Scanner with Divergent Micro Lens
FIGS. 4, 5, 6—Variable Focus Optical Element in Various States of Activation
FIG. 7—Quad Array of Optical Scanners
FIGS. 8 and 9—Wide Angle Scanning Array Projector
FIG. 10—Immersive Optical Scanning System
FIG. 11—Eye Tracker
FIG. 12—Reflector Scanner Imaging System with Sealed Optics
FIG. 13—Isometric 3D View of the Reflector Scanner Imaging System
FIG. 14—Imaging of Near Objects and Accommodation
FIG. 15—Creating Real Images Exhibiting a True Depth of Field from Virtual Objects
FIG. 16—Single Degree Of Freedom V-Gap Optical Element
FIG. 17—Close-up detail of V-Gap Optical Element Hinge Area
FIG. 18—Small Cross Section of Adaptive Optics Reflector Array
FIG. 19—Fixed Array of Variable Focus Optical Elements
FIG. 20—Steerable Variable Focus Optical Element in a Convex State
FIG. 21—Steerable Variable Focus Optical Element in a Concave State
FIG. 22—Array of Steerable Variable Focus Optical Elements in a Concave State
FIG. 23—Array of Steerable Flat State Optical Elements
FIG. 24—Metamaterial Beam Steering Plates
FIG. 25—Metamaterial Beam Steering Plate Array
FIG. 26—Array of Micro Scanner Direct Projection Optical Elements
FIG. 27—System Integrating Glasses

FIG. 1 shows an example of a monolithically micromachined beam steering device 102. Its design and function is the subject of U.S. Pat. Nos. 5,872,880, 6,086,776, 6,127,926, and 7,201,824 B2. In one embodiment, light is first introduced into the core of optical element 116 at point 118 and is emitted at point 120. The slightly divergent beam then travels a short distance through free space and strikes the surface of double gimbaled micromirror 108. In another embodiment, an optical beam modifier, such as a ball lens, a GRIN lens, or any other optical element may be introduced after point 120 to further alter the beam before striking double gimbaled micromirror 108. In another embodiment, an optical beam modifier may be introduced after striking micromirror 108. Two additional examples of beam modifiers include an electrostatic comb driven, variable focus lens that dynamically controls beam divergence and has an optical axis that is aligned with v-groove 114, and a Variable Focus Optical Element 615, shown in FIGS. 4 through 6. One way to arrange a VFOE 615 into a configuration such as FIG. 1, would be to rotate optical element 116, 90 degrees from its shown position such that a beam emanating from point 120 would strike a VFOE 615 at a 45 degree angle and proceed down the length of v-groove 114 towards micromirror 108. Once striking micromirror 108, the controlled vergence beam can be directed away from surface 103, with two degrees of freedom. It can be appreciated that there are an unlimited number of ways in which someone skilled in the art might arrange optical beam modifiers and optical elements to affect the equivalent operations on a light beam as it proceeds to, or departs from micromirror 108.

The first and second nested gimbaled frames of double gimbaled micromirror assembly 106 can move independently, and in one embodiment, are driven with electrostatic forces between pads on each respective gimbaled frame and substrate walls 110. In this example, an electrical control signal is introduced on bond pads 112, causing current to flow through address lines 104, that induces a charge profile between the electrostatic actuator pads and substrate walls 110, resulting in electrostatic forces that direct micromirror assembly 106 into a predefined orientation. It can be appreciated that the angular motions and positions of micromirror 108 can be very precisely controlled by the manipulation of current, magnetism, charge, voltage potential, thermal expansion, shape memory effect, or any other controlled application of force.

In this one embodiment, the substrate of beam steering device 102 is fabricated from a silicon wafer having a (100) crystalline orientation. When exposed to an anisotropic etchant such as a heated potassium hydroxide solution, exposed silicon surfaces are vigorously etched until crystal plane orientations of <111> are reached, at which time, etching effectively ceases. These are the surfaces that define precision v-groove 114 and substrate walls 110. Micromirror assembly 106 and its flexures are fabricated using standard Micro Electro Mechanical Systems processes such as photolithography, chemical vapor deposition, sputtering, and plasma etching, before being released by an anisotropic etch. The micromirror assembly 106, is then deployed and fixed into the cavity defined by substrate walls 110. The resulting atomic plane alignment between v-groove structures provides for a highly accurate alignment between the optical axis of optical element 116 and the center of micromirror 108. It can be appreciated that optical element 116 could take any optical assembly form including a small laser, LED, incandescent light source, or perhaps a laser and GRIN lens combination. In another embodiment, a double gimbaled laser diode could replace double gimbaled micromirror assembly 106 and directly produce a multi degree of freedom steerable beam.

Given the proper size constraints, many miniaturized beam steering devices, or image projection devices, having the ability to project a two dimensional image could be an equivalent substitute for beam steering device 102. For example, a double bounce off a suitable combination of two, single degree of freedom steerable micromirrors could produce the two degree of freedom beam steering behavior as well. Similarly, a linear array of independently modulated beams could be steered in a direction transverse to its length with a single degree of freedom micromirror, and so on.

Figure 2:
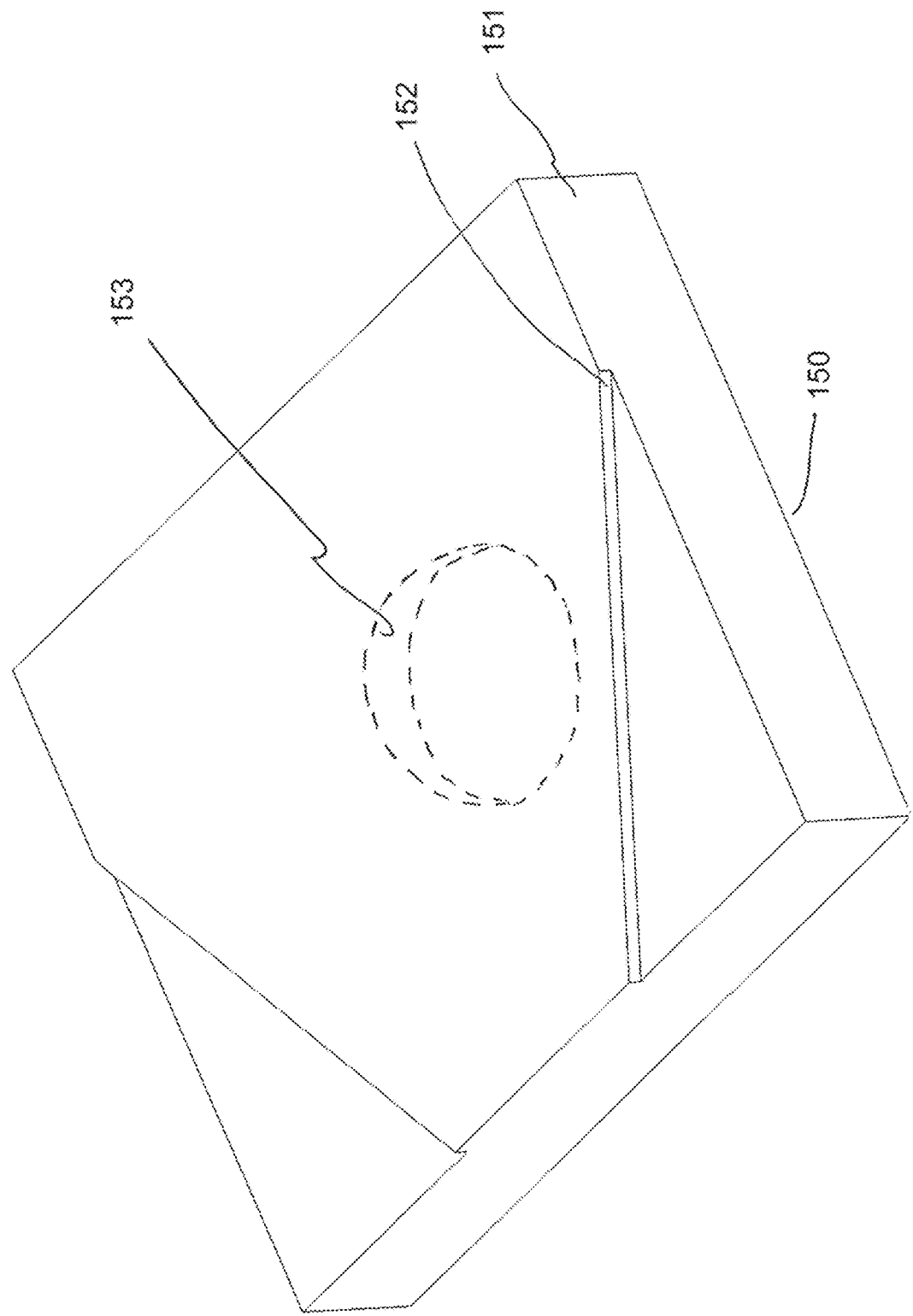

FIG. 2 shows optical element 151 configured as a high Numerical Aperture (NA) negative lens. The lower surface 150, exhibits a hollowed out hemispherical section 153, while the upper surface is flat, although both the upper and lower surfaces could take any shape, including concave, convex, or flat, and may be constructed from any optical material exhibiting refraction, reflection, metamaterial properties, birefringence, total internal reflection, or any other optical property. In this particular example, one possible function of optical element 151 could be to increase the total scan angles produced by micromirror 108. It can be appreciated that additional optics may be placed after optical element 151 to further modify a beam. In one embodiment, registration edges 152 are etched into the upper surface of optical element 151 to provide accurate assembly alignment for additional optics such as turning prism 350.

Figure 3:
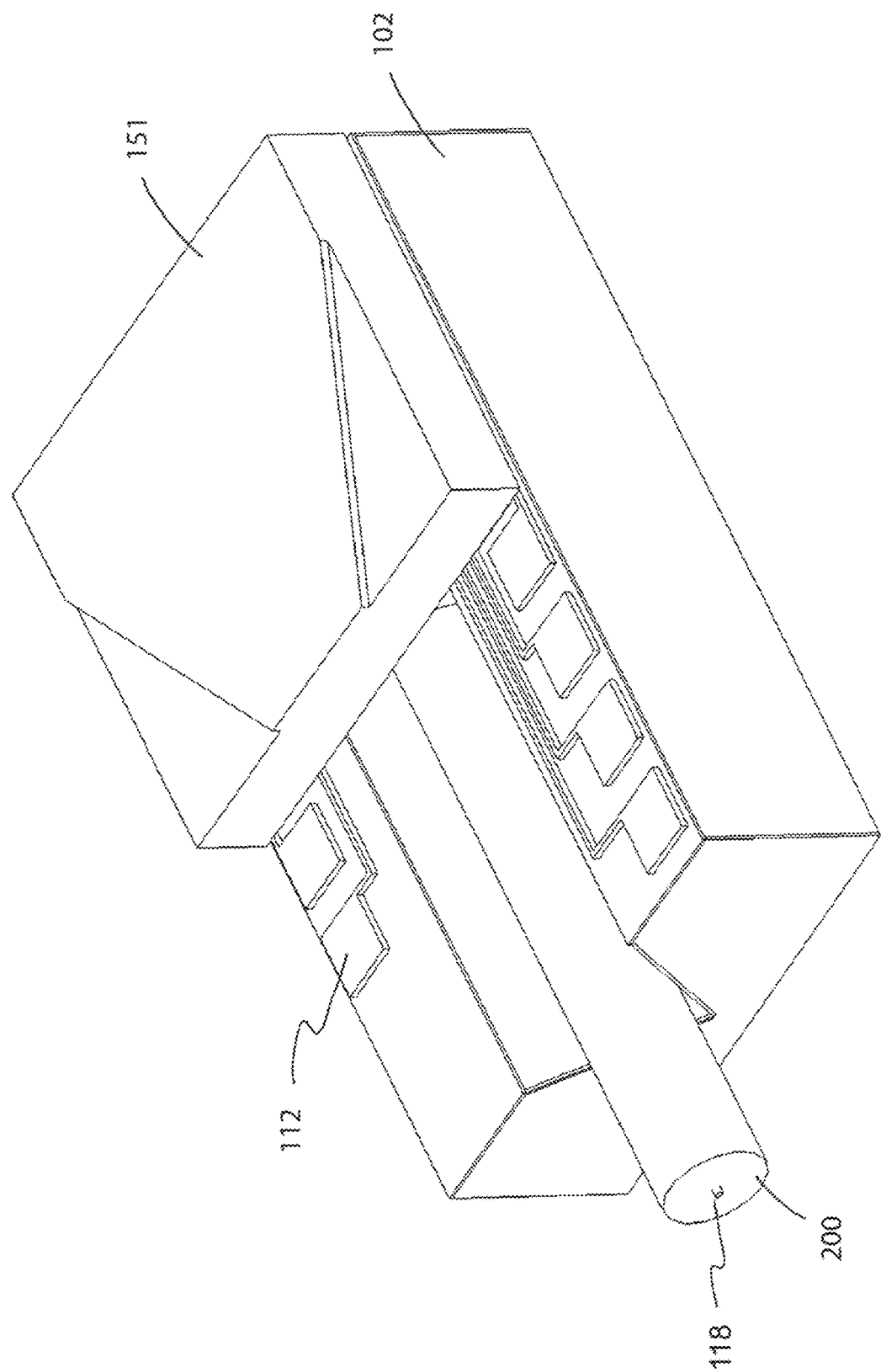

In one possible embodiment shown in FIG. 3, a beam steering device 102 can be mated with optical element 151. If optical element 151 possesses a net negative diopter, then the scan angle of emerging two degree of freedom beams can be increased. In general, optical element 151 may take the form of a doublet lens, singlet lens, compound lens, lenslet array, positive lens, negative lens, achromat, asphere, freeform lens, GRIN lens, reflective or refractive element, multi-dielectric stack, prism, emitter, absorber, light sensor, temperature sensor, magnetic sensor, magnetic coil, photodiode, liquid crystal display, photo darkening element, active or passive filter, or any other optical, electo-optical or electrical element. Optical element 151 could also take the form of a variable focus lens where one or more optical sub-components could be controllably moved in a direction normal to, or in a direction lateral to or with any of three degrees of rotation with respect to surface 103. Further, relative displacements between the elements of such a variable focus lens could be controllably provided with piezoelectric stacks, acoustic forces, magnetic forces, electrostatic forces, thermal forces, shape memory forces, or any other application of force that is known to those in the art. In yet another embodiment, beam steering device 102 is not coupled to optical element 151.

Figure 4:
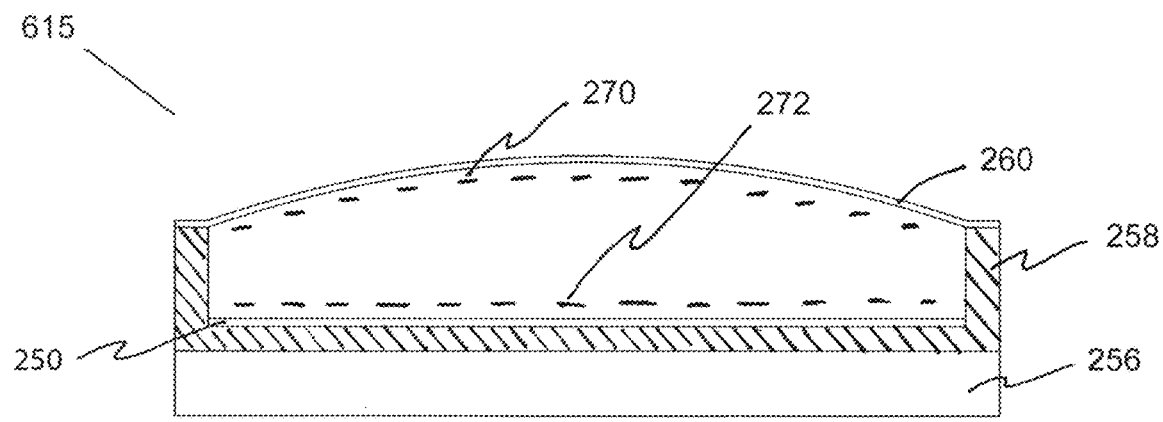
Figure 5:
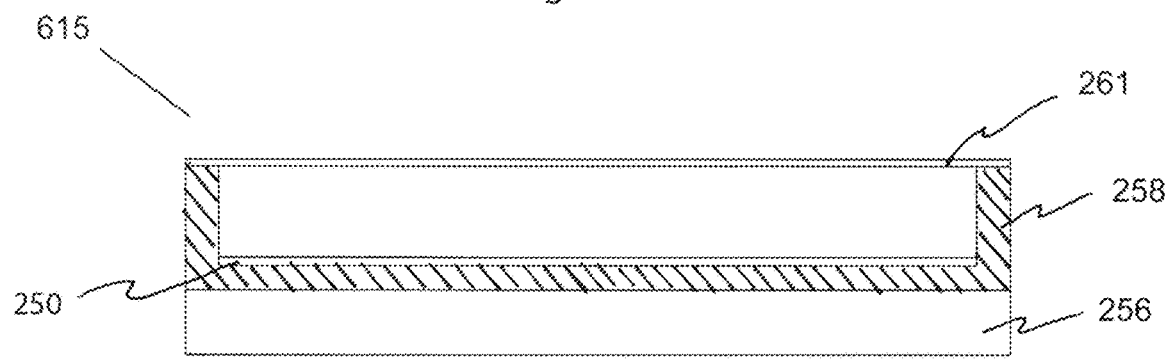
Figure 6:
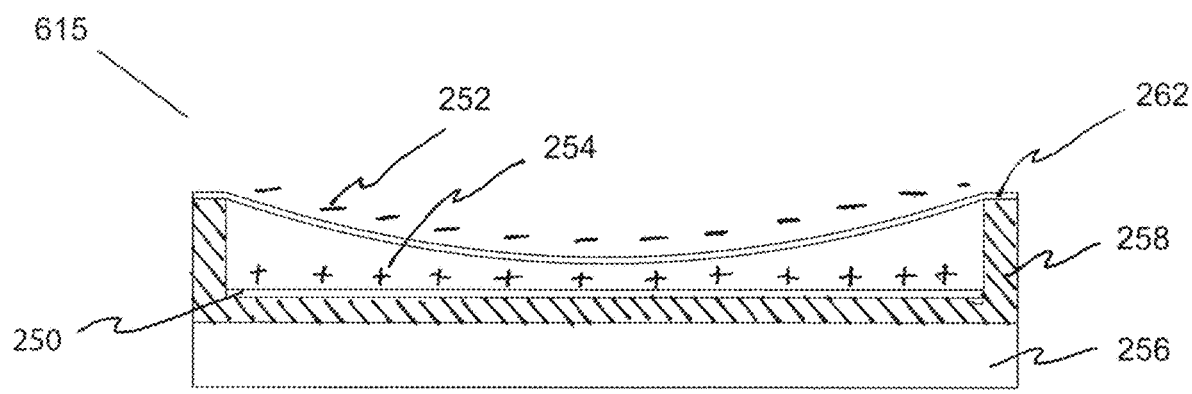

FIGS. 4, 5, and 6 show the cross-section of a Variable Focus Optical Element 615, configured to precisely and incrementally control the shape of its reflective surface from concave to convex and any shape in-between. In a simple form, the surface shape could be spherical, a revolved conic section, or aspherical. Alternate shapes and rotationally non-symmetric contours could be achieved by adjusting the degree and location of upper surface internal stresses using modifications to deposition and plasma etching parameters, including relief cuts. Regardless, one basic function of a VFOE 615 is to control the degree of concavity or convexity of its surface such that the vergence of a reflected beam may be precisely controlled, or equivalently, the positive or negative focal length may be controlled. For example, this can be useful for focusing a beam that strikes reflective concave surface 262 as shown in FIG. 6, or to simply reflect a beam, unmodified, off flat surface 261 in the case of FIG.

5, or to cause an impinging beam to increase its divergence after striking reflective convex surface 260 as shown in FIG. 4. Controlling a beam's vergence before it enters the eye, allows one to control the perception of an object's distance from the viewer as well as its depth of field.

In FIG. 4, negative charges 270 and 272 are injected onto the conductive surface 250 and reflective convex surface 260, thereby providing a repulsive force that causes the thin film diaphragm to bulge outward. Similarly, in FIG. 6, opposite charges 252 and 254 are placed on conductive surface 250 and reflective concave surface 262 thereby providing an attractive force that causes the thin film diaphragm to be drawn inward. If no charges are present, then the reflective thin film reflective flat surface 261 remains undisturbed, as in FIG. 5. For a single mode beam on the order of 10 microns in diameter, a small VFOE can respond very quickly to input commands Insulator 258 can be formed on substrate 256 using standard micromachining techniques. Etching a hollow cavity beneath the optical surface may be accomplished by providing a series of perforations about its circumference. Alternatively, a preformed cavity could be bonded to the upper surface optical components as an assembly step. There are many equivalent ways in which a device of this type can be fabricated as known by those skilled in the art. If conductive, the optical surface might also provide for actuation forces if nested in a gimbaled frame. The optical surface of a VFOE 615, might take the form of a simple micromirror, a multidielectric stack, a metamaterial, an optical grating array, a static convex or concave optical element, an actively variable concave or convex optical element, or any other optical element that can transmit, absorb, polarize, upconvert, downconvert, lase, emit, refract or reflect electromagnetic radiation.

Other methods of force generation may be used in addition to electrostatic forces. For example, micro-coils formed on surfaces 260, 261, or 262 and 250 can produce magnetic forces sufficient for deflection, or a magnetic material could be utilized on a surface facing a micro-coil to provide these forces. Gas or liquid pressure within the cavity could also provide controllable deformation forces. These pressures could be provided by a high or low pressure source, or could be produced by a hot or cold sink imparting work on the fluid. Similarly, thermal bimorph, shape memory effects and phase transformation of some solids such as wax could also provide these deflection forces. In fact, any force implementation to produce controllable deflections of the reflecting surfaces may be used.

Figure 7:
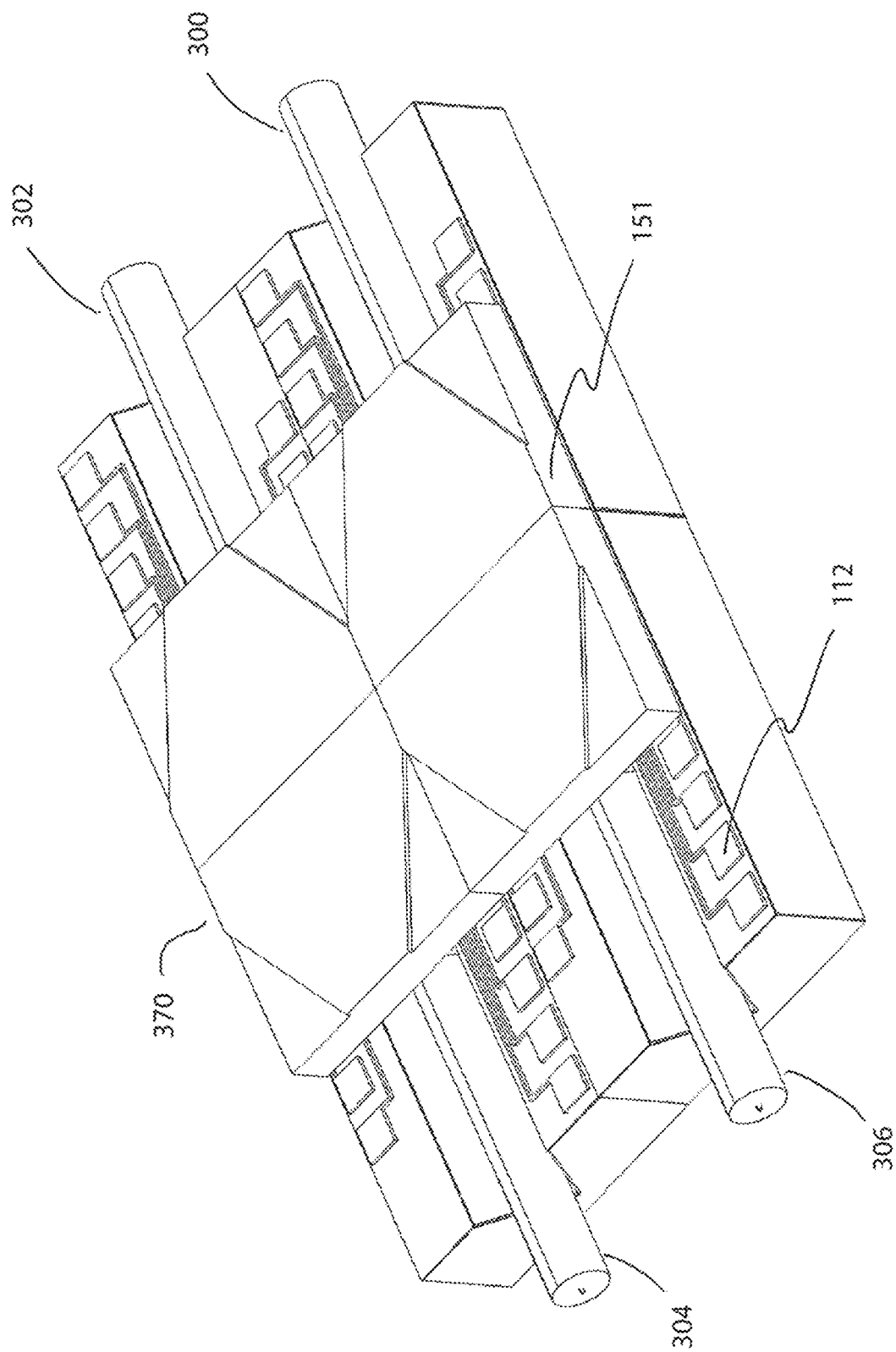

FIG. 7 shows one embodiment of a quad array 370, defined by a grouping of four beam steering devices 102, which are provided with optical elements 151. Optical elements 300, 302, 304 could each deliver a single frequency of say, red green and blue to the steering micromirrors, 108, or any superposition of wavelengths that vary with time and amplitude. The fourth optical element 306, can be used to expand the color gamut with an additional color such as yellow, or may be used as an observation channel to receive, record, or quantify incoming light signals from the eyes to determine, in one example, the reflected position of the pupil with respect to the head, and in another example, receive reflected, refracted or scattered light from within the eye, for say, medical purposes. As before, pads 112 deliver, in one example, voltage control to independently steer each of the four micromirrors 108. Any of these optical elements 300, 302, 304 or 306 could be used as dedicated observation channels or dynamic observation channels, wherein a small portion of the duty cycle is used for observation and the remaining time is used for carrying a specific wavelength, a combination of wavelengths, or superposition of wavelengths. In another embodiment, quad array 370 may be comprised of one or more beam steering devices 102, or any multi degree of freedom projecting devices, and may include beam modulators that can vary a beam's amplitude, polarization state, wavelength composition, or degree of vergence.

Figure 8:
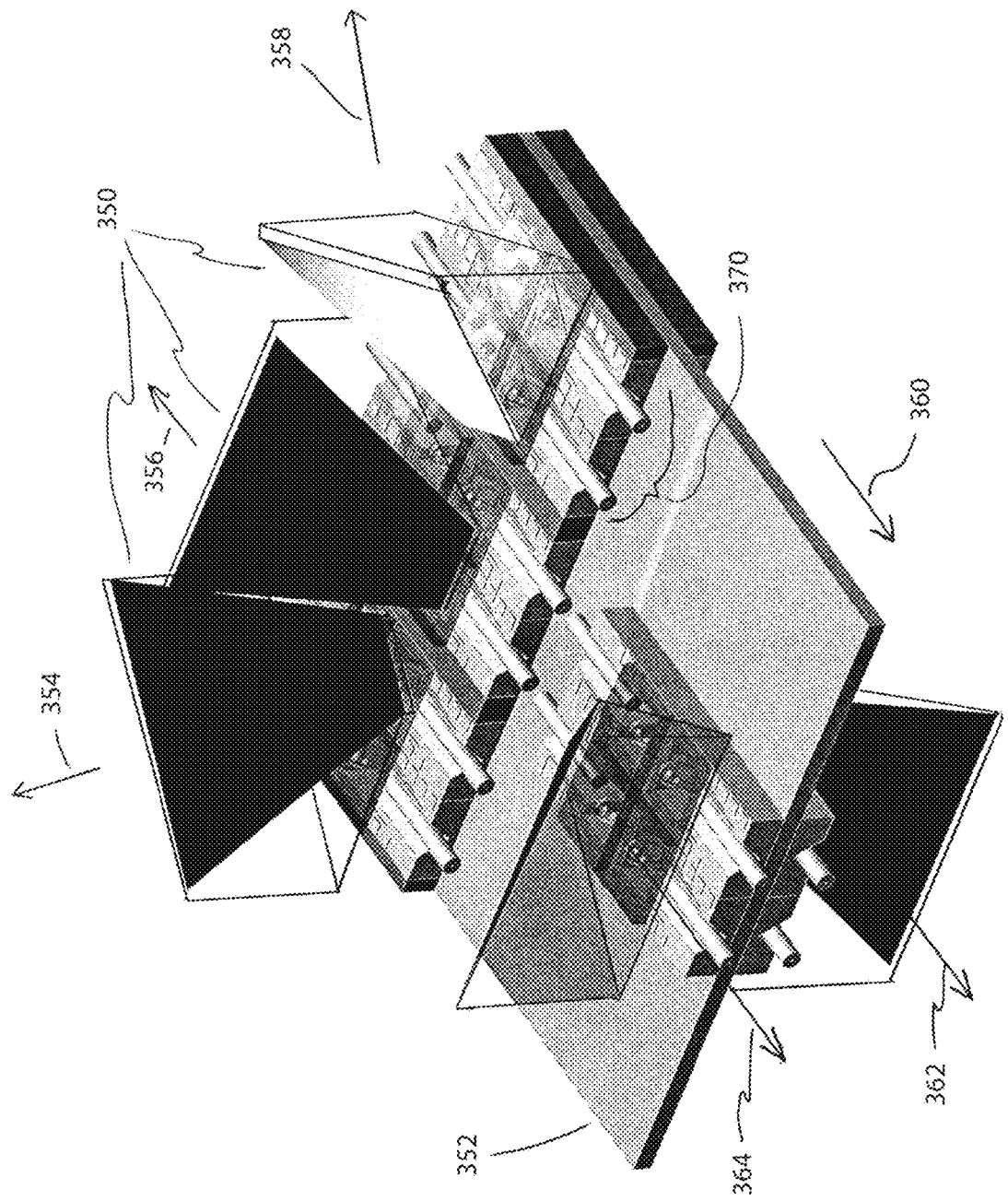
Figure 9:
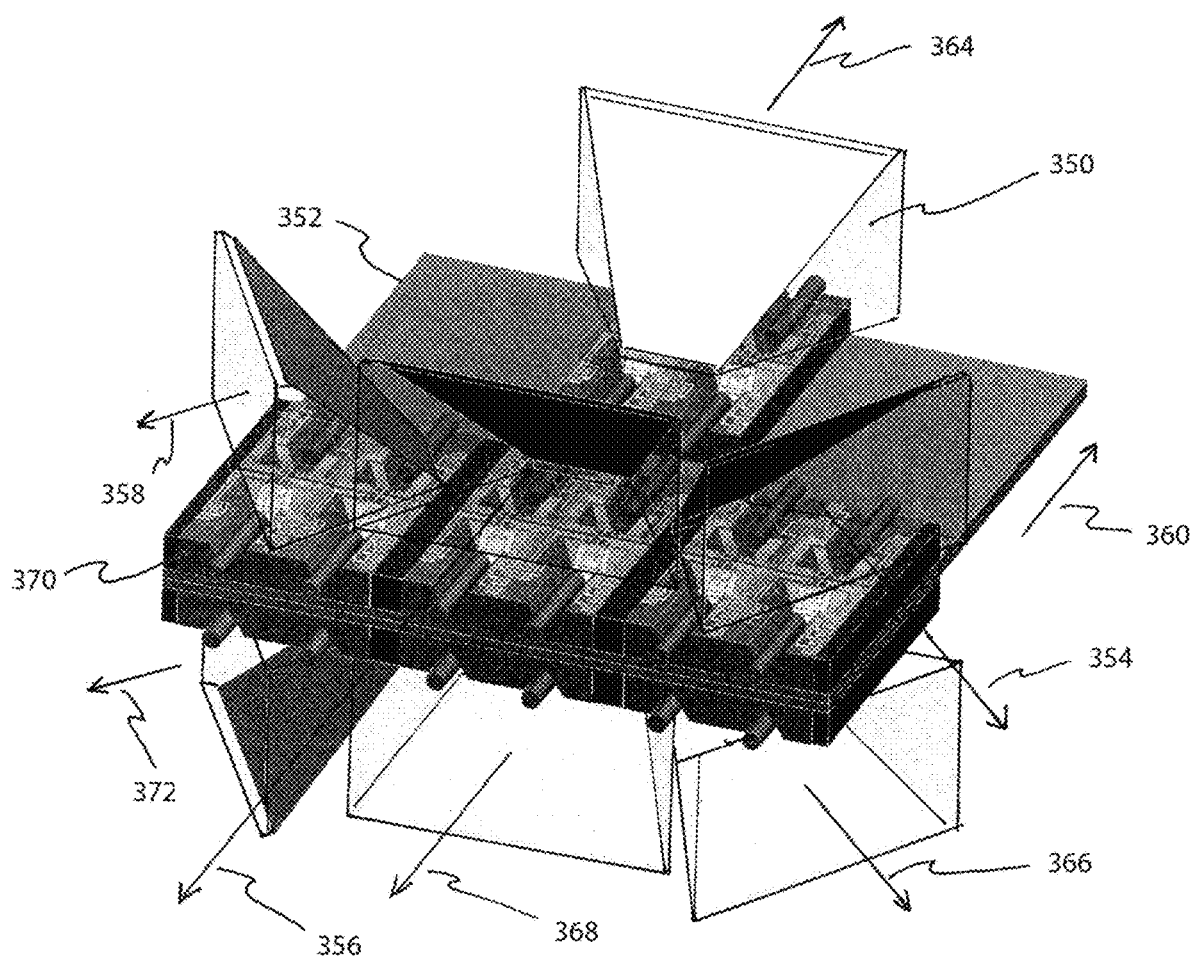

FIGS. 8 and 9 show one possible configuration for an array of sub-projectors 371. The grouping, taken as a whole, will be referred to as a scanning projector 440. As two degree of freedom beams emerge from quad array 370, they are projected up and away from upper surface 103, and then deflected in a substantially horizontal direction by right angle turning prism 350. As described previously, turning prism 350, is bonded to the surface of the quad array 370, and is precisely aligned over the emerging beams with the help of registration grooves 152. This creates one example of a sub-projector 371. It can be appreciated that sub-projector 371 may simply consist of one or more beam steering devices 102. Eight sub-projectors 371, are placed on a common substrate 352, and are fixed at selected relative angles with a high degree of precision. In this example, the three sub-projectors 371, on the upper surface of substrate 352 and facing rearward, cover approximately 180 degrees of scan angle as exemplified by vectors 354, 356, and 358, wherein each sub-projector 371, provides approximately 60 degrees of scan angle. A single sub-projector 371, on the upper surface faces forward, and towards the eye, as indicated by vectors 360 and 362.

Figure 10:
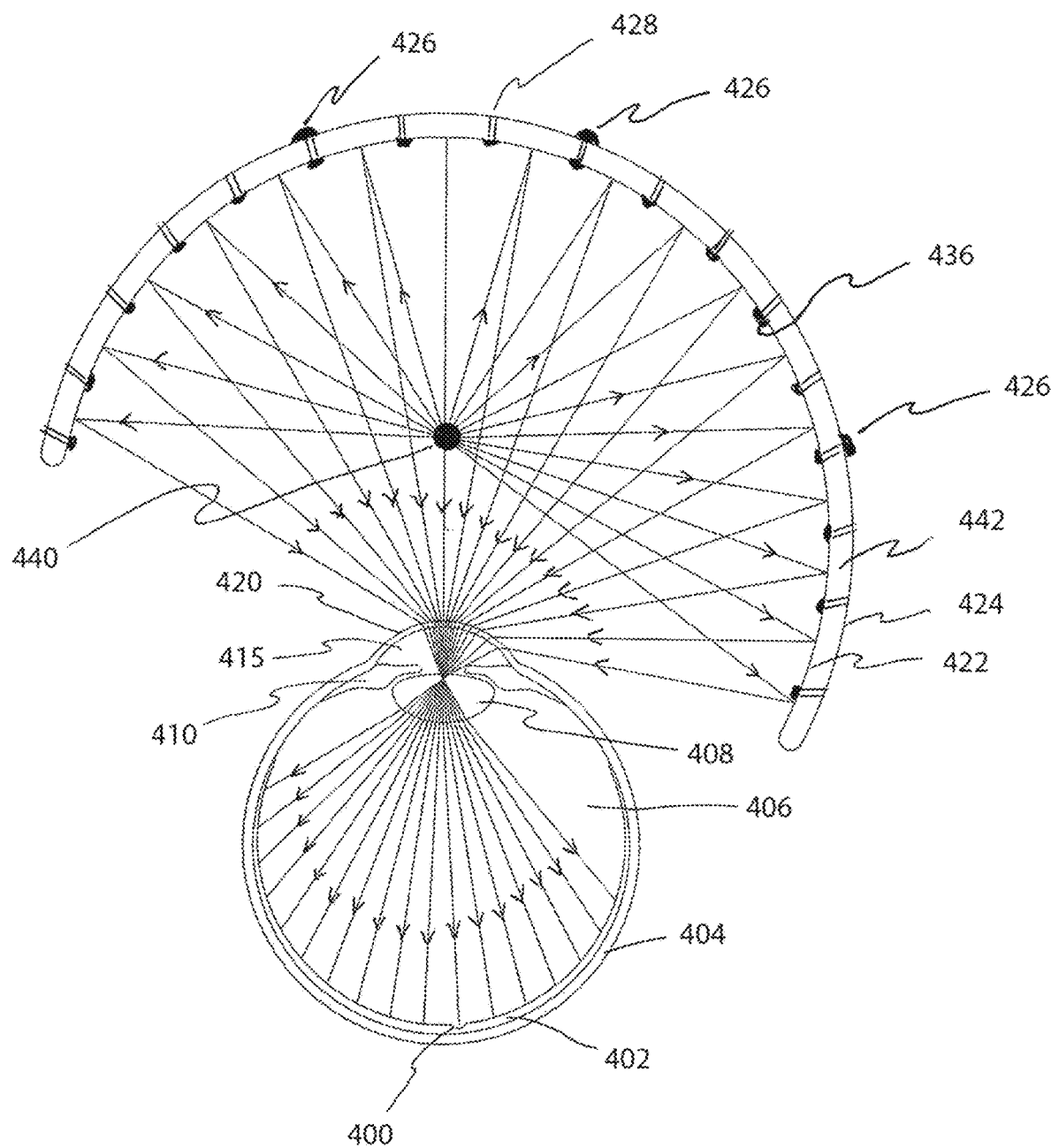

In this one embodiment, a symmetric configuration is established with four more sub-projectors 371, on the lower surface of 352, thereby providing an additional scan space defined by vectors 366, 368, and 372. This configuration allows for approximately 180 degrees of horizontal scan and 120 degrees of vertical scan. The forward facing sub-projectors 371, project directly into the eye so as to "hide" scanning projector 440 from a forward gaze. FIGS. 8 and 9 show merely one possible combination of an array of sub-projectors 371. In fact, a single capable beam steering device 102 affixed to a headset in close proximity to the eye could also provide a full immersion, wide angle view. It can be appreciated that any device that can project a two dimensional image could also substitute for a sub-projector 371, and that a sub-projector array may be composed of a single, or a multitude of sub-projectors. It may be noted that by dividing the full visual field, as shown in FIG. 10, into sectors that correspond to sectors covering the retina, and by utilizing a multitude of sub-projectors to individually address these sectors, a highly parallel projection system is created. This provides for a great improvement in dynamic performance in that every individual sub-projector, having a smaller area to project to, can complete its task more rapidly.

FIG. 10 shows the top view of a horizontal plane bisecting the ray traced optics of one possible configuration for an immersive optical scanning system, and its relationship with the eye. In this view, the ray traces are approximately valid for any other plane whose normal vector is orthogonal to the optical axis of scanning projector 440. Although the ray arrows show a path from scanning projector 440 to the retina 402, as with most optics, the ray paths are reversible and photons can travel in either direction. It may be noted that the angular extent of reflector body 442 is approximately 110 degrees to the right and 60 degrees to the left, representing the full, horizontal field of view for a human right eye gazing straight ahead. Not shown is the approximately 50 degrees upwards and 70 degrees downwards extent of reflector body 442.

In one embodiment, scanning projector 440 is placed near the center of a revolved approximately conic section reflector body 442. A first surface mirror 422 reflects beams emanating from scanning projector 440 back towards the pupil, and ultimately, onto the retina. The outer surface 424 of reflector body 442 is shown supporting forward and lateral looking, wide angle cameras 426. With sufficient resolution, these cameras could provide a similar field of view and binocular vision one could see if no display were present. By forwarding this visual data stream to scanning projector 440, and directing the reflected beams via wide field reflector body 442 directly into the eye, the illusion of headset transparency would be complete for distant objects. These cameras might also detect other wavelengths of light including UV and IR. They might also gather depth of field information or provide telescopic and microscopic functions. In addition, other sensors might provide "synthetic vision" by sensing magnetic, radio, proximity, capacitive, thermal, electric, acoustic, sonar, or radar data to name just a few energy fields. One can appreciate that any radiation source that is detectable may be viewable with this embodiment or any number of variations. Other form of abstract data could also be arranged for "synthetic vision" presentation such as thermal profiles or a map of tactile information.

In one possible configuration, a wide angle environmental data set may be gathered from cameras and sensors, and arranged in a visual format with high speed data processors. Any virtual reality data may then be merged with the environmental data. The resulting data set might then be divided into a number of sectors each representing a specific location on the retina, with the totality of all sectors representing full retinal coverage. Referring to FIGS. 8 and 9, the six rearward facing sub-projectors could be assigned a total of six sectors of data, with the remaining two forward facing sub-projectors receiving a small subset of sector data to recover the field of view they themselves obscure. The six rearward facing sub-projectors 371 then emit beams corresponding to their data sets that reflect off first surface reflector 422 and impinge on the cornea 420. Similarly, the two forward facing sub-projectors 371 also emit their data set beams, which directly impinge on the cornea 420. The light beams then pass through the aqueous humor 415, past the iris 410, through the crystalline lens 408, through the vitreous humor 406, and onto the surface of the retina 402.

In another embodiment, reflector body 442 may be transparent or translucent, and first surface reflector 422 can be a partial mirror. Performance levels can be adjusted by reconfiguring the type and number of components used. For example, in some versions of a pass through AR design, a single outward looking wide angle cameras 426 can be used for frame stabilization while two or more outward looking wide angle cameras 426 can be useful for AR, VR or MR designs.

With eye tracking information, it is possible to deferentially increase the bandwidth of a sub-projector 371, whose sector data falls within the visual field of forward gaze. This is advantageous because visual acuity is by far, the greatest at the center of the visual field, as determined by the fovea 400. And if bandwidth is restricted, dynamic reallocation may be in order.

In one eye tracking embodiment, the angular position of the pupil may be determined by using a pulse of IR light provided by one or more IR emitters 428 residing near the inner face, or around the perimeter of reflector body 442. The IR light pulse might also be provided by the scanning projector 440 itself. Other wavelengths of light may be used as well. An array of eye tracking sensors 436, disposed near the inner surface of reflector body 442, may detect reflected light from the user's pupil and cornea. This information may then be used to deduce an accurate position of the eye relative to the reflector body 442, and subsequently, the relative position of the eye to the head. The function of eye tracking sensors 436 might be replaced by an inward looking camera, or an observation channel as previously described in FIG. 7. IR emitters 428 and eye tracking sensors 436 may be supplanted if scanning projector 440 provides both IR eye illumination and IR reflection analysis.

A camera or observation channel could also observe corneal reflection patterns, retina physiology, or the IR reflections emanating from an illuminated pupil to ascertain eye position.

In yet another embodiment, eye tracking might be enhanced by establishing fiducial marks directly on the cornea or sclera 404. One possible configuration employs an inkjet that micro prints directly onto the eye with biocompatible fluorescing dyes. Other types of inks or dyes could be used as well. The marks could also be printed onto the eye by direct contact transfer, as with a stamp for example. It can be appreciated that one could employ many methods to print marks onto a surface. The positions of these marks could then be observed with one or more cameras, sensors, or observational channels. For aesthetic reasons, the dyes can be invisible under normal lighting conditions. However, when stimulated by the proper wavelength of light, these fluorescing fiducial marks, perhaps in conjunction with bandpass filters, might effectively provide a high contrast, non-ambiguous frame of reference for effectively tracking rapid eye movements. Using two or more micro dots, for example, could yield information for all three axes of eyeball rotation.

The shape of reflector 422 may be approximated by ray tracing backwards from the retina to the scanning projector 440. An assumption is made here that a rod or cone cell's response to an impinging photon is invariant with respect to angle of impingement.

The following illustrates one approximation method for obtaining the surface form of a passive reflector that can redirect a ray of light originating from a projection point to rod and cone cells on the retina.

1) Obtain the family of vectors that is characterized by a ray trace originating from a rod or cone cell within a defined sector of the retina, wherein the ray proceeds through the center of the exit pupil and proceeds out from the cornea.
2) Select a point that lies a chosen distance from the cornea and that also lies on the visual axis when gazing straight ahead. This represents the point in space occupied by scanning projector 440.
3) Define a sphere of a given radius, centered on the point of projection selected in step 2.
4) Select a vector emanating from the center of the retinal sector analyzed in step 1.
5) Find the 3D point of intersection of the vector selected in step 4, and the surface of the sphere defined in step 3.
6) Calculate, if it exists, the normal vector for a differential reflector surface element that will satisfy equal angles of incidence and reflection back to the projector.
7) Select another vector from set 1 and repeat steps 5 and 6.

8) Stitch together the correctly oriented surface elements found in steps 6 and 7. If the surfaces are not contiguous, then modify the initial projection radius until they are.
9) Repeat steps 7 and 8 until the full vector set in step 1 is exhausted.
10) If the resulting piecewise reflector surface is smooth and contiguous, repeat 1-9 to find all such sector surfaces and stitch together to form the finished reflector.

If the resulting surface cannot be made piecewise contiguous and smooth, then iterate to a solution in the following manner.

11) Increase or decrease the initial diameter of the projection sphere in step 3 and recalculate until a satisfactory surface is found, or
12) Move the point of projection closer or further from the cornea in step 2 and recalculate, or
13) Obtain a second, much larger set of vectors within the selected retinal sector that represent a ray emanating from a photoreceptor through any point within the exit pupil.
14) Select the smoothest surface previously found, and recalculate for the new set of photoreceptor vectors found in step 13.

If an acceptable reflector surface still cannot be found, then the addition of a corrector lens may be used.

A passive reflecting surface defined thusly, should provide a minimal vector set for full access to all photoreceptors in the eye. However, if a distortion free, true depth of field image is difficult to create using a passive reflector, or a passive refractive corrected reflector, then an adaptive reflective surface may be used instead. Once all visual and other data has been produced, gathered, and processed by high speed algorithms, the information is passed to scanning projector 440 which emits light beams in such a way that the bulk of photoreceptors are provided with photons having the correct intensity, color, timing, and relative positions to produce an illusion of visual immersion.

Figure 11:
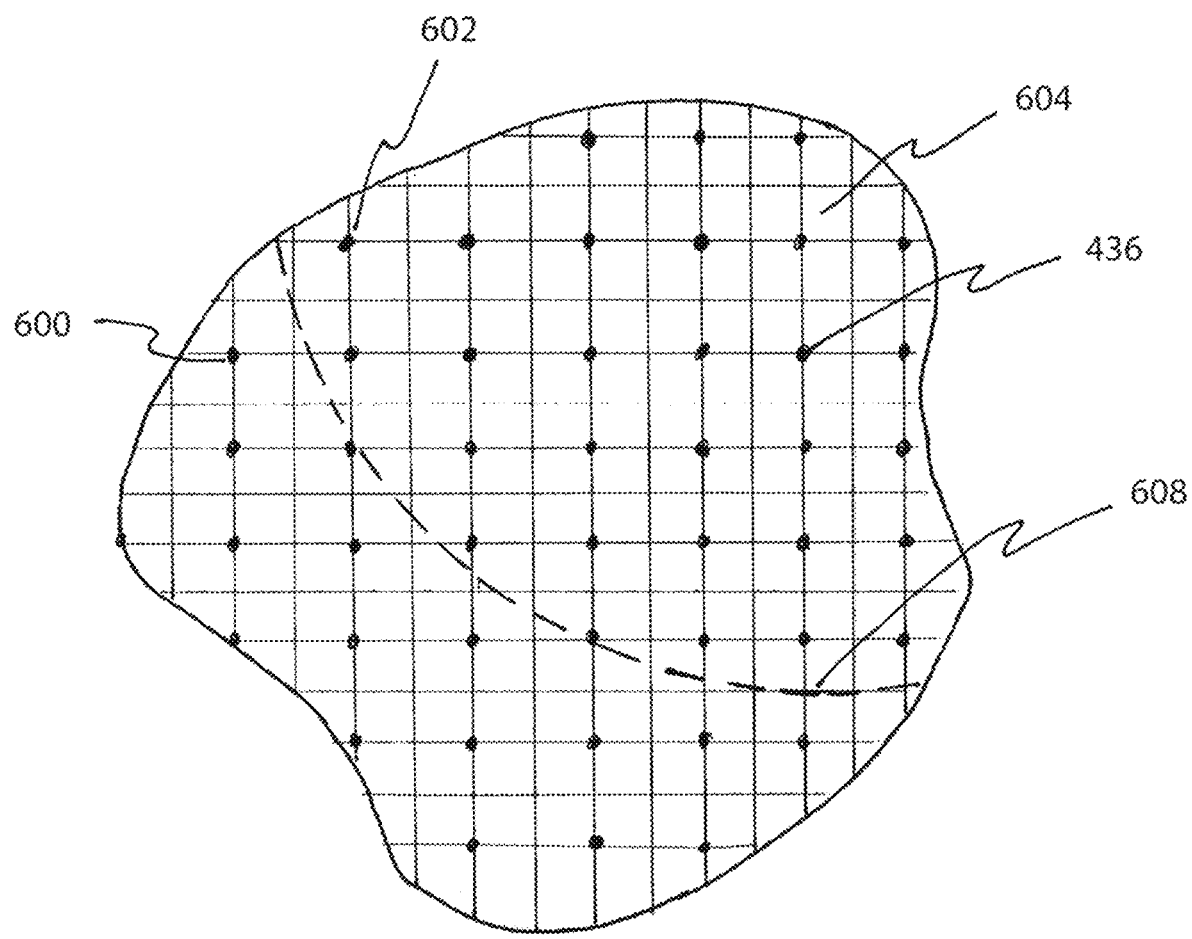

FIG. 11 shows another possible configuration for a high speed eye tracker, wherein the inner surface of reflector body 442, may be covered with an array of photodiodes 436. These photodiodes 436 may be interstitially placed between beam reflector areas 604, or Micro Scanner Direct Projection Optical Element 820. A short burst of IR radiation can be sent to the eye via IR emitters 428, or scanning projector 440. The resulting return signal may be projected onto the sensor array and the pupil's image can be found by comparing the strength of the signal from those sensors 602 that are in a "shadow", and those sensors that are in a brighter area, as is sensor 600 for example. With a fine enough coverage, a good geometric location and shape of the pupil circumference 608 can be determined, from which, the pupil radius and the center of gaze can be deduced. As photodiodes can respond very quickly to a signal, this would provide for a high speed eye tracker. It can be appreciated that any photon sensing element can substitute for a photodiode.

Figure 12:
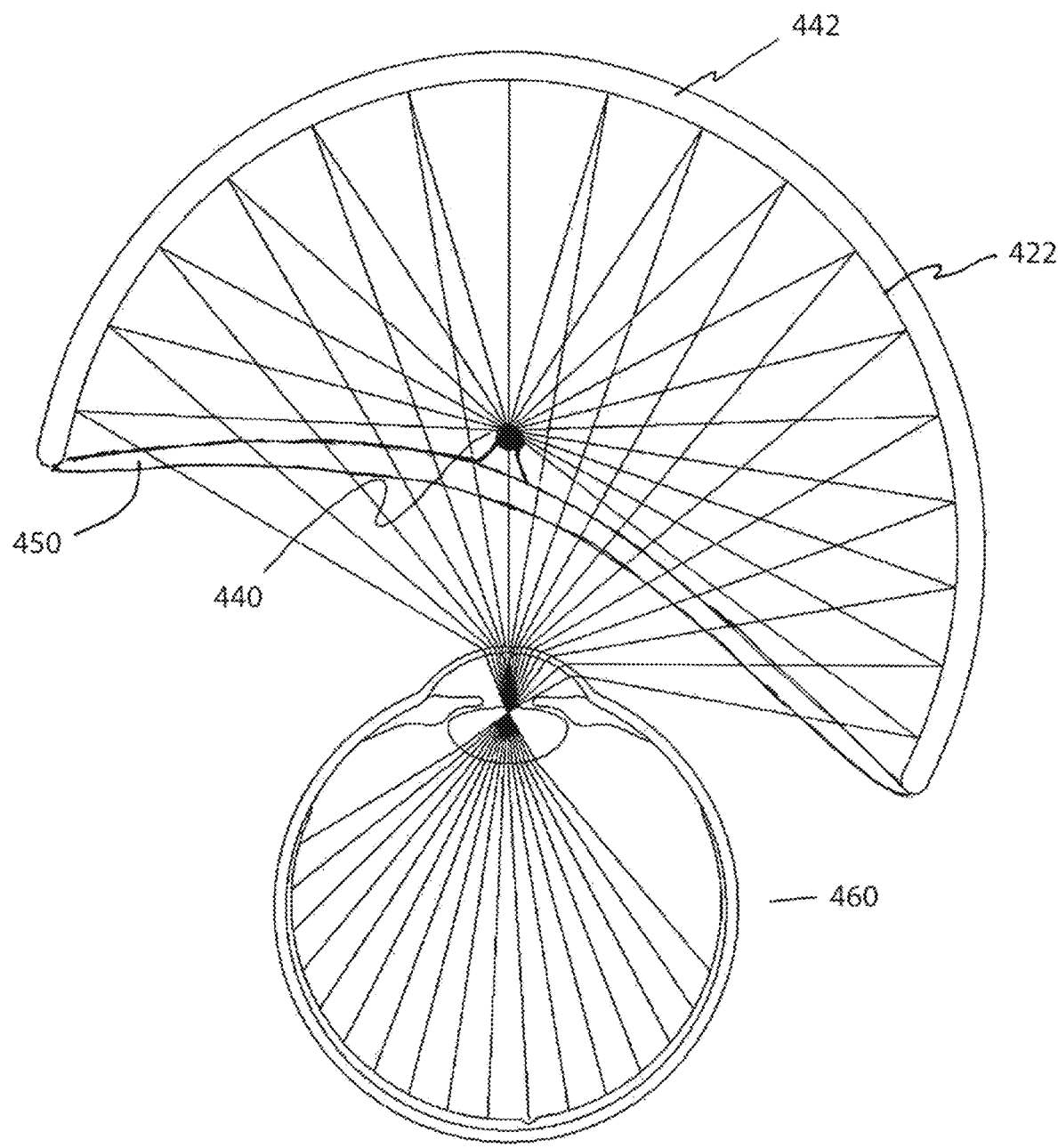

FIG. 12 shows one possible configuration for sealing an immersive optical projection device. The introduction of a refractive corrector plate 450, provides for sealing a delicate first surface reflector 422 and scanning projector 440, as well as possibly correcting for a user's vision problems, or for further refining projected beams as they ply their way towards the eye 460. The reflector body 442, may be hermetically sealed to the refractive corrector plate 450, providing for a moisture resistant environment. It can be appreciated that a refractive corrector plate 450 might also be in direct contact with surface reflector 422. In another embodiment, refractive corrector plate 450 can be a thin section bridging the open end of reflector body 442, or extending from one edge to the center of reflector body 442, for the purpose of mounting scanning projector 440, and carrying electrical and optical signals to and from scanning projector 440.

Figure 13:
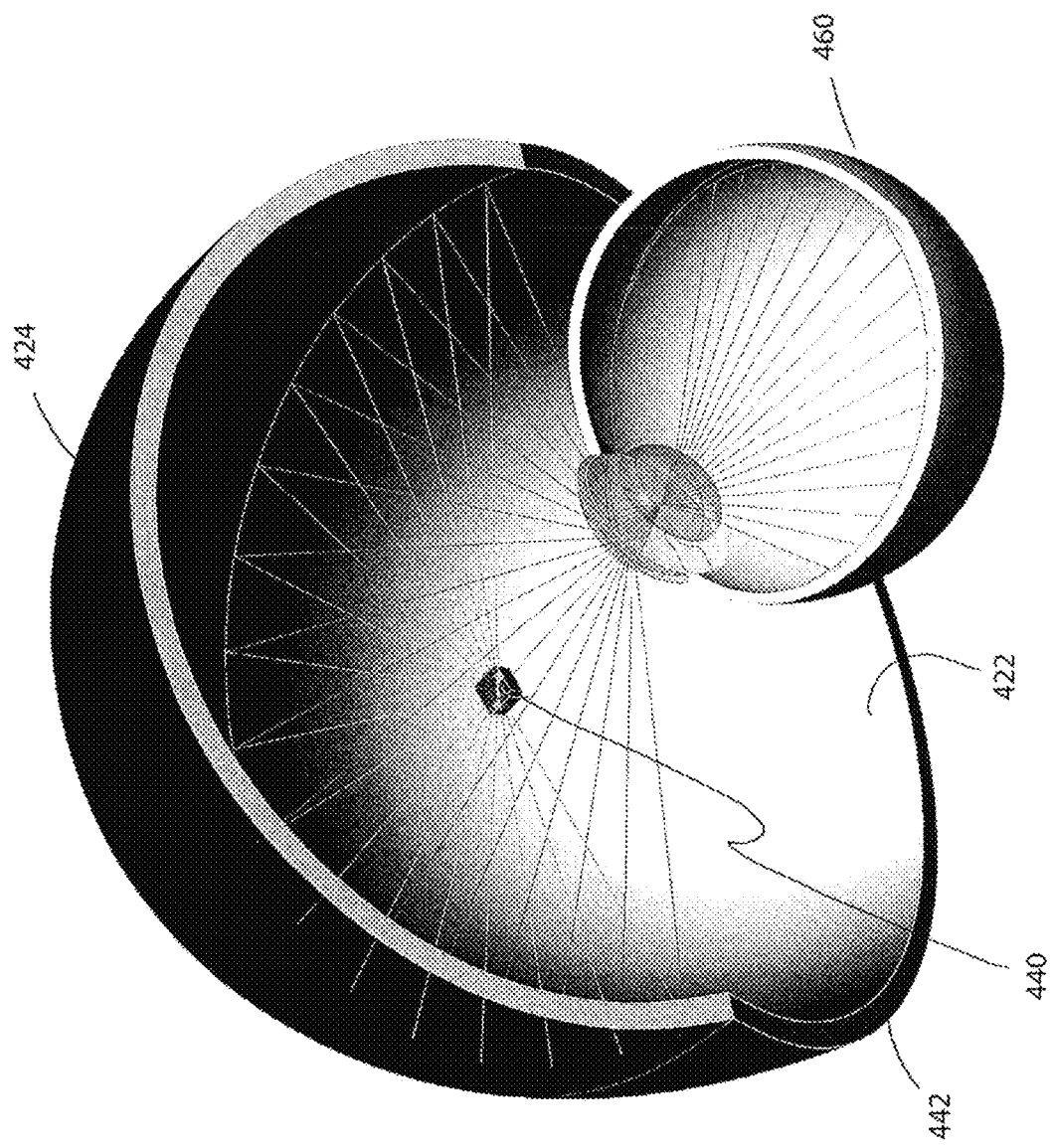

FIG. 13 shows an isometric perspective view of the reflector scanner imaging system and the relative positions of the eye 460, the reflector body 442, the scanning projector 440, the first surface reflector 422 and the outer surface of the reflector body 424. In this embodiment, the corrector plate 450 is absent.

Figure 14:
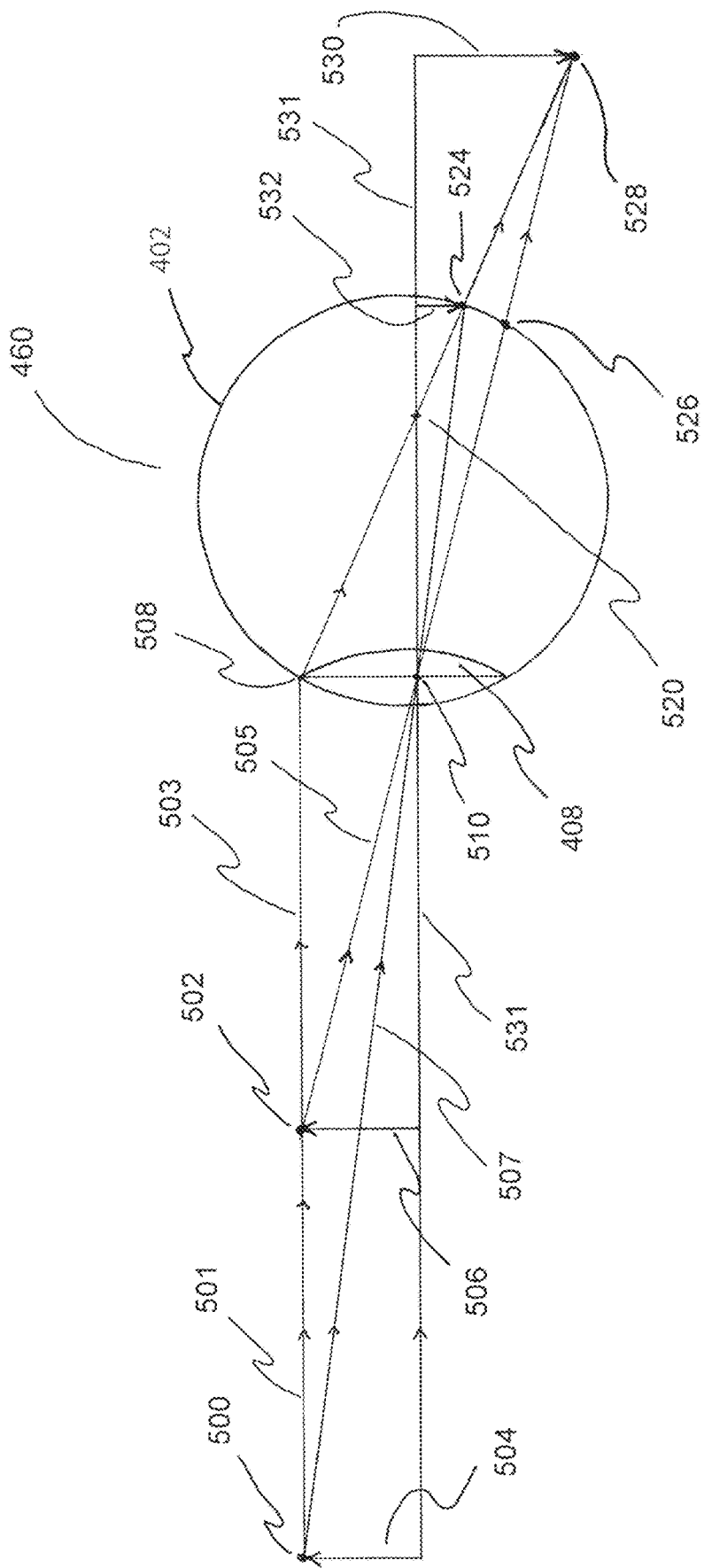

FIG. 14 shows the optical paths of a near object and the resultant images produced on, and behind the retina 402. A vertical cross-section of the optical paths involving a distant object 504, and a near object 506, with respect to eye 460 is shown. In this view, the retina 402 is represented by a circle, and the crystalline lens and cornea are represented by a simple double convex equivalent lens 408b, with a focal length found at point 520. Using simple lens geometry, we select a horizontal beam of light 501 emanating from the tip 500, of distant object 504, and traveling parallel to the optical axis of the eye 531. The beam progresses to point 508, and is refracted through equivalent lens 408b, passes through focal point 520, and strikes retina 402 at tip 524 forming the tip of real image 532. A ray 507, passing from tip 500 through the center of equivalent lens 408b remains unaltered and also reaches tip 524. As expected, the real image 532 is inverted and focused on retina 402.

A similar ray tracing process from the tip 502 of near object 506, produces a real image 530 that comes to a focus behind the eye at image tip 528. It can be seen that beams 503 and 505 emanating from near tip 502 pass through point 508 and center point 510 respectively of equivalent lens 408b, and impinge on retina 402 at point 524 and tip 526 respectively. Because they do come to a focus on the retina, near object 506 appears blurred. If equivalent lens 408b attempts to accommodate to the blurred image, it will thicken, thereby increasing its optical power, and move near real image 530 into sharp focus on retina 402.

Figure 15:
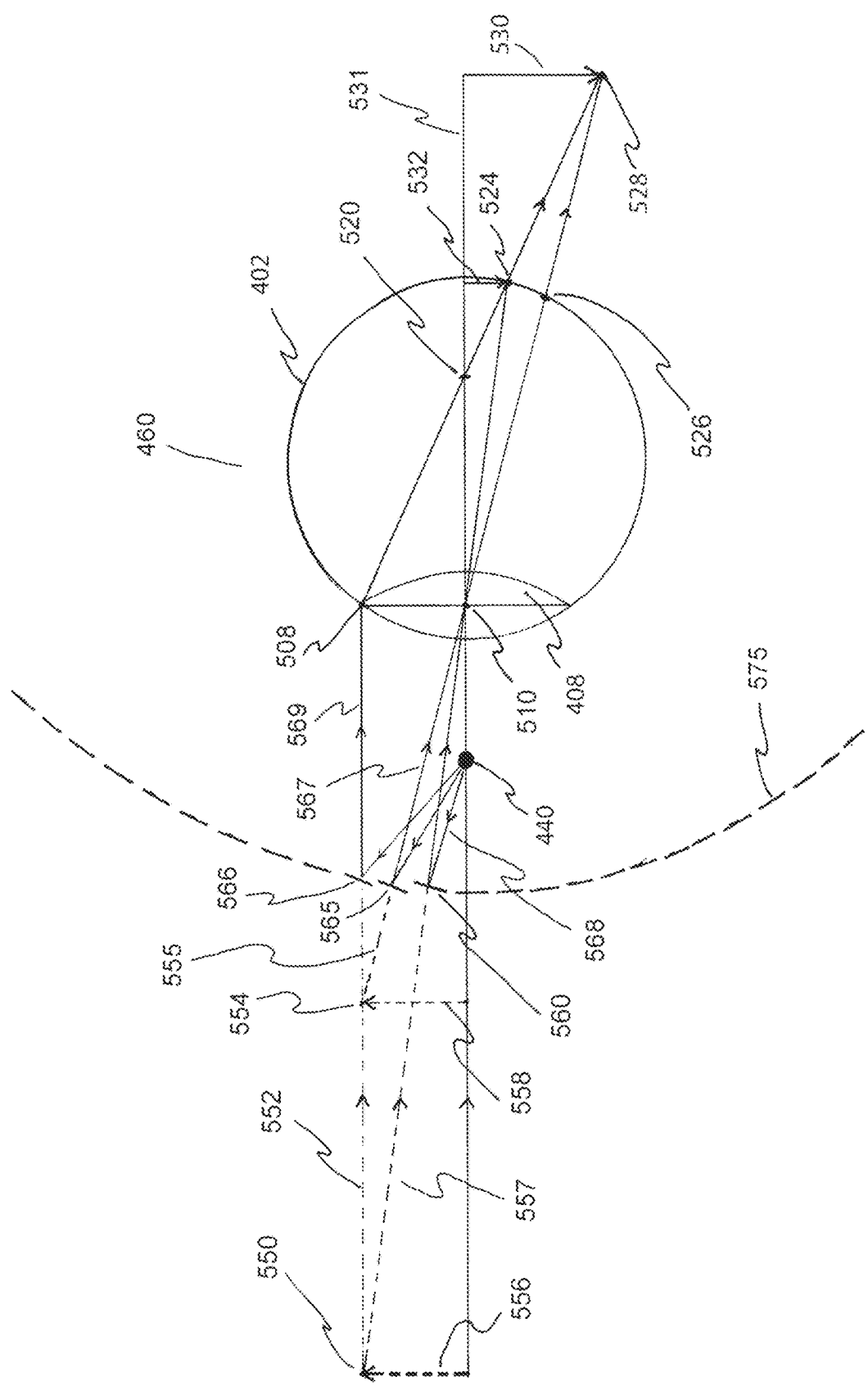

FIG. 15 shows how an adaptive reflector array 575 can produce a real image exhibiting a true depth of field by selectively steering beams from a projected virtual object. In FIG. 15, distant virtual object 556 and near virtual object 558 replace the real objects 504 and 506 respectively, found in FIG. 14. In addition, an adaptive reflector array 575 is placed in close proximity to the viewer's eye 460. The adaptive reflector array has the property that a multitude of steerable optical elements covering the surface closest to the eye can be individually adjusted at will to modify the trajectory of an impinging beam of light. This can be useful for emulating the divergent ray properties produced by a nearby object, as well as the nearly parallel ray emanations from a distant object.

Beginning at the tip 550 of distant virtual object 556, a horizontal virtual beam 552, parallel to optical axis of the eye 531, proceeds to point 508, and is refracted through equivalent lens 408b, passes through focal point 520, and terminates at tip 524 on retina 402. And virtual beam 557 departs from tip 550, passes through the center point 510 of equivalent lens 408b, and likewise terminates at tip 524 on the retina. Of course a real image is not formed since virtual objects do not produce photons. However, by precisely defining the theoretical direction, color, and intensity of a virtual beam at the exact point of intersection with adaptive reflector array 575, and substituting, at each point on the surface of that reflector array, a real beam of light exhibiting those exact properties, then a real image 532 of the virtual object 556 can be formed.

To create a real image of distant virtual object 556, a real beam 568, having the correct properties of direction, intensity and color calculated for virtual object 556 at that point, is emitted by scanning projector 440 towards adaptive steerable optical element 560. The steerable optical element 560 is tilted slightly out of plane with respect to adaptive reflector array 575 insuring that beam 568 is directed towards point 524. Similarly, a correctly calculated beam 569 is emitted from scanning projector 440 and strikes tilted steerable optical element 566 and proceeds to point 508, and onto retina 402 at point 524.

And similarly, the ray trace for a virtual near object proceeds as follows. Beginning at the tip 554 of near virtual object 558, a horizontal virtual beam 552, parallel to optical axis of the eye 531, proceeds to point 508, and is refracted through equivalent lens 408*b*, passes through focal point 520, and terminates at tip 528 behind retina 402. And virtual beam 555 departs from tip 554, passes through the center point 510 of equivalent lens 408*b*, and likewise terminates at tip 524 behind the retina.

To create a real image of near virtual object 558, a real beam 567 having the correct properties of direction, intensity and color calculated for the virtual object at that point, is emitted by scanning projector 440 towards adaptive steerable optical element 565. The steerable optical element 565 is tilted slightly out of plane with respect to adaptive reflector array 575 such that beam 567 is directed towards focus point 528. Similarly, a correctly calculated beam 569 is emitted from scanning projector 440 and strikes tilted steerable optical element 566 and proceeds to point 508, then point 520 and arrives at the point of focus at 528 behind retina 402.

Because the adaptive reflector array 575, in conjunction with scanning projector 440, can produce real images at any depth of focus from calculations derived from virtual objects, the eye should not be able to distinguish the difference between a real and virtual depth of focus. The images can appear just as real, and the crystalline lens can accommodate to the appropriate focus just as if it were produced by a real object.

In one embodiment, the adaptive reflector array 575 is comprised of single Degree Of Freedom steerable optical elements. That is, the rotation axis of any steerable optical element is normal to any vertical plane of cross section having center point 510 in common. This configuration can provide moderately good images. In another embodiment, multi DOF optical elements can be used to produce a greater range of optical properties, angles, and depths of field for more demanding images. An adaptive reflector array 575 employing multi DOF optical elements can achieve 20/20 visual resolving power by steering an approximately 2.5 mm diameter beam into the eye, resulting in a 5 micron spot size on the retina. This configuration can also correct for astigmatism or any other off axis optical errors in the viewer's vision. In a general case then, an adaptive reflector array 575, composed of two DOF or three DOF steerable optical element arrays can provide for a corrected, real image, with binocular cues and a true depth of field evoking an accommodation response for a single lens, and a vergence-accommodation response for a binocular configuration, thereby producing a total sense of visual immersion.

The following steps represent one possible process for calculating and projecting a real, near field image from a virtual object set.

1. Define a spherical surface S of radius Ri, centered on the pupil, where Ri is initially the closest focal distance in front of the viewer.
2. Find the surface intersections between the virtual scene components and the surface of sphere S.
3. Calculate the proper intensity, color, location, and direction of light beams produced by the virtual surface intersection elements found in step 2.
4. Calculate the tilt angles of all steerable optical elements on adaptive reflector array 575 to simulate the virtual elements found in steps 2 and 3.
5. Actuate those steerable optical elements and project the calculated beams from scanning projector 440, onto those elements.
6. Increment Ri by a small amount (move the intersection with the virtual object further away).
7. Repeat the full process from step 1 forward until the full front to back scan is complete.

OR—

1. Repeat steps 1 through 5, but scan all areas of the adaptive reflector array 575, thereby including distant imagery with near objects during a single projection.
2. Continue with steps 6 and 7 as above.

Figure 16:
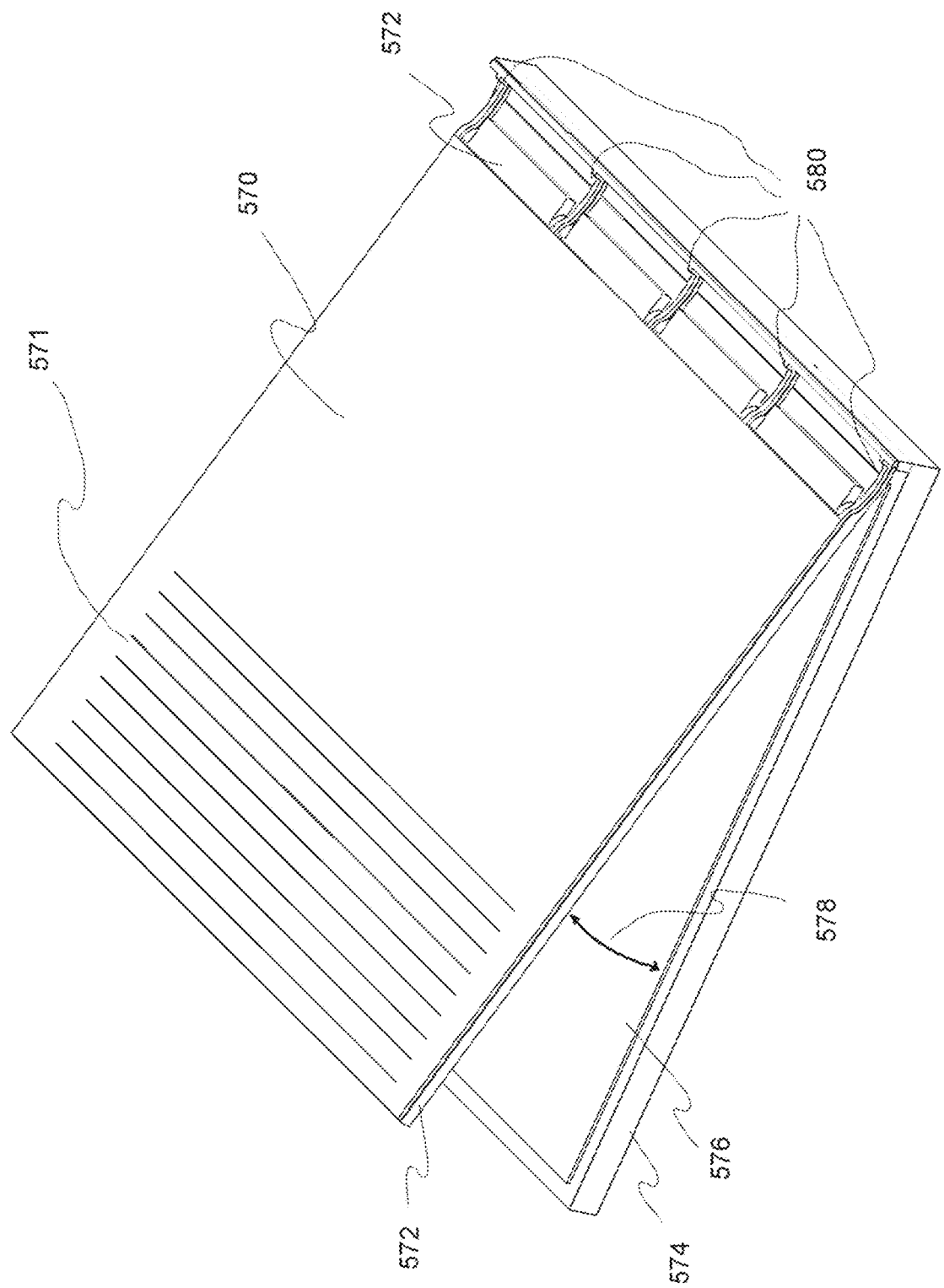

FIG. 16 shows one embodiment of a single degree of freedom V-Gap Optical Element. The optical surface 571, can take the form of a simple micromirror, a multidielectric stack, a metamaterial, an optical grating array, a static convex or concave optical element, an actively variable concave or convex optical element, or any other optical element that can transmit, absorb, upconvert, downconvert, lase, emit, refract or reflect radiation, or modify any other optical property.

In this embodiment, the VGOE is composed of an optical surface 571 that is supported by an upper substrate 572 that can be controllably opened to a v-gap angle 578 relative to a lower substrate 574. In one configuration, a controllable, antagonistic force is established between hinges 580 and an electrostatic force provided by charges present on the actuator surface 570 of upper substrate 572 and actuator surface 576 on lower substrate 574. If v-gap angle 578 is zero when the device is inactive, then the controlled introduction of like charges on actuator surfaces 570 and 576 will cause the v-gap angle to increase, overcoming the closing forces of hinges 580. If the hinges 580 normally force the upper substrate 572 into a positive v-gap angle 578 with respect to lower substrate 574 with no charges present on actuator surfaces 570 and 576, then the introduction of opposite charges placed on actuator surfaces 570 and 576 will provide a v-gap closing force to overcome the hinges 580 opening forces. In either case, a precise v-gap angle 578 can be established by controlling the charges present on actuator surfaces 570 and 576. It can be appreciated that magnetic forces could be substituted for electrostatic forces, thereby producing the same control of v-gap angle 578. Equivalently, hinges 580 might be comprised of a thermal bimorph, a piezoelectric bimorph, or a shape memory element, thereby providing an opening or closing motion to control v-gap angle 578 without the use of electrostatic or magnetic driving forces. Indeed, a host of other forces, such as thermal expansion, local optical heating, or any other force, could also provide angular or linear displacement in a similar fashion.

In this one example, the variable capacitance established by the two actuator surfaces 576 and 570, could provide a voltage feedback signal to actively control v-gap angle 578. Similarly, any optical, magnetic, thermal, electrical, mechanical, stress, or strain sensing circuits monitoring hinges 580 or of v-gap angle 578 could also provide a feedback signal to precisely control the gap angle.

Optical surface 571 could take the form of an optical grating that produces bright colors from reflected white light wherein the reflected wavelength is dependent on the relative angle between the grating, the light source and the observer. In another embodiment, the frequency output of optical grating 571 could be controlled electronically wherein the spacing between each successive ruling can be varied. In yet another embodiment, various colors might be produced using an electronically variable thin film interference device wherein an electronically controlled gap between a transparent or translucent upper surface and a reflective lower surface is provided. The controllable gap might be a vacuum gap in one configuration or a media filled gap in a multitude of alternate configurations. In other configurations, the color of optical surface 571 could be controlled by magnetically, electrically, optically, or thermally varying a spectrally dependent reflecting micro structure.

Figure 17:
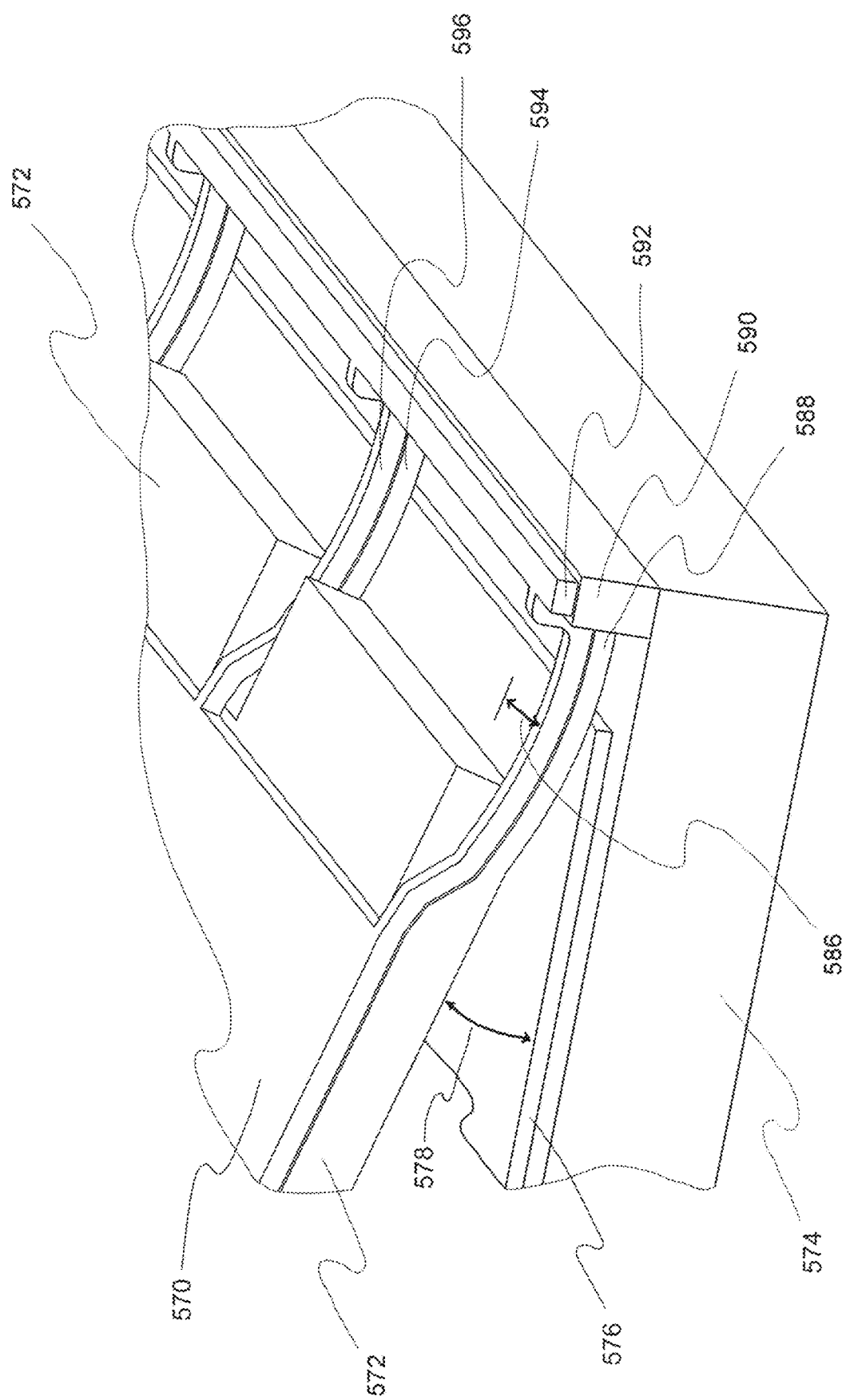

FIG. 17 shows the hinge area of one possible configuration of a Single DOF VGOE. Given an electrically insulating lower substrate 574, an actuator surface 576 is deposited, patterned and is addressable via electronic circuitry. A sacrificial layer (not shown for clarity) and an additional insulating layer are then deposited and patterned to form the cantilever support bar 590 and insulating upper substrate 572. A controlled depth etch profile 586 is then applied to all hinge areas to adjust the overall thickness of insulating upper substrate 572 in the hinge area. This will have the effect of adjusting the spring rates of the final hinge layer profiles 588 and 594. Any number of hinges 580 may support a v-gap optical element. Providing a stress gradient across the thickness of insulating upper substrate 572 with various deposition techniques may also allow a controlled depth etch profile 586, to move variable angle 578 to a chosen static position, when the device is inactive. Actuator surface 570 may be deposited and patterned as before and may be electronically activated via address bar 592. An additional insulating layer (not shown) may be deposited over actuator surface 570 followed by optical surface 571. Any number of actuator and optical layers may be fabricated on upper substrate 572, and may communicate with address bar 592 and external electrical circuits via areas of conduction represented by hinge area 596. Once all layers have been patterned, the sacrificial layer is removed, thereby freeing upper substrate 572, and allowing it to move to its static position.

Figure 18:
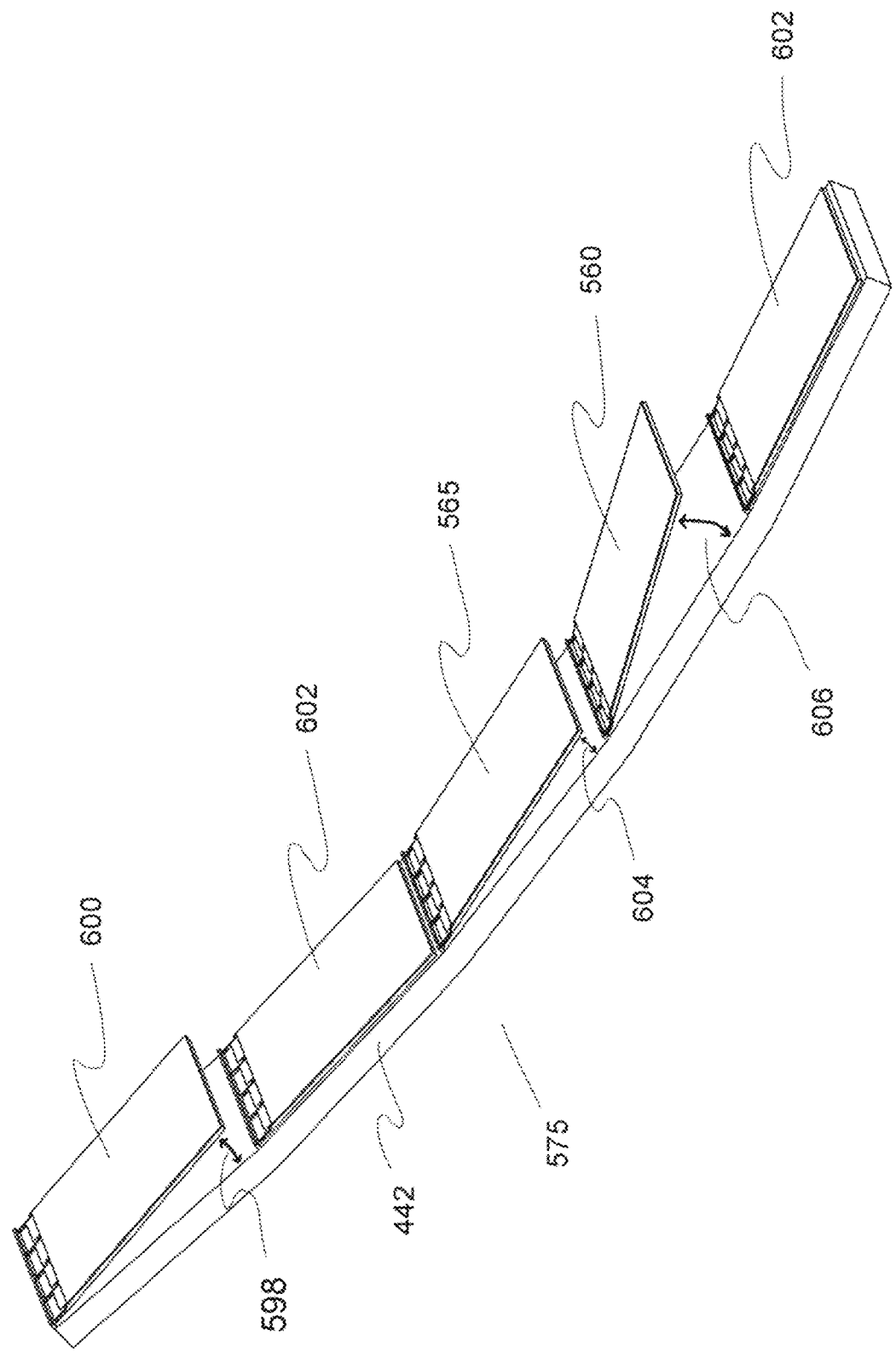

FIG. 18 shows a small cross section of one embodiment of an adaptive reflector array 575. In this particular example, a small length of a single column of SDOF VGOEs is disposed on a section of reflector body 442. In practice, this small array might continue in a linear fashion for perhaps hundreds or tens of thousands of elements. An entire adaptive reflector array 575 might then be composed of perhaps hundreds or tens of thousands of such columns placed side by side, effectively substituting for the passive, revolved approximately conic section reflector body 442 shown in FIG. 27.

Two VGOEs 603 are shown in a fully closed state. Their optical surfaces are nearly parallel to the local surface of adaptive reflector array 575. VGOEs 601, 564 and 562 are shown driven to various precise angles 598, 605, and 606 respectively. In this way, the exact deflection angle of an impinging light ray will be controlled at each point on the surface of adaptive reflector array 575. With SDOF VGOEs, the rotation axis of any steerable optical element may be normal to any plane of cross section having center point 510 in common (see FIG. 15). The family of normal vectors exiting the surface of each optical element might be overly constrained for some applications, due to the compound curvature of the reflector body, such that propagating wave front aberrations might be excessive. Thus, in another embodiment, a multi DOF optical element might replace a single DOF element, or a combination of single and multi DOF optical elements could be utilized to create a higher order DOF adaptive reflector array 575.

Figure 19:
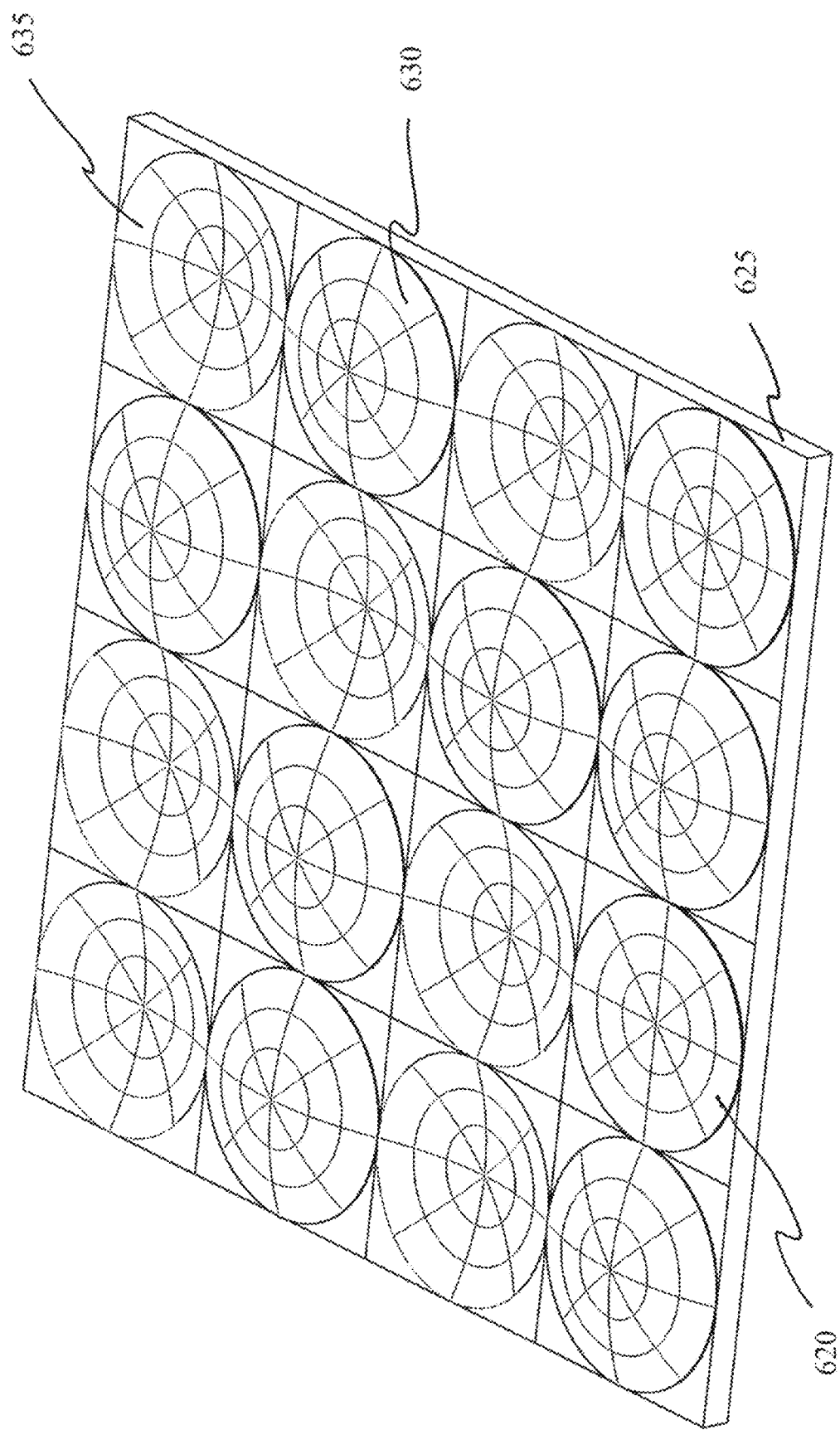

FIG. 19 shows one possible configuration of a Variable Focus Optical Element Array 625, composed of an array of VFOEs 615, as described in FIGS. 4, 5 and 6. Each VFOE is connected to its neighbor in a semi-rigid manner such that the optical axis of each VFOE is somewhat aligned with respect to its neighbors. The optical surfaces of each VFOE can vary in curvature. In particular, VFOE 620 is in the inactive state, producing a flat surface. In one possible example utilizing electrostatic actuation, VFOE 635 has opposite charges on its upper and lower surfaces, thus, the diaphragm surface assumes a concave shape. And VFOE 632 has been activated with like charges and its surface has assumed a convex shape.

Depending on the size of an individual VFOE, an array can shape individual beams to be less or more divergent with good fidelity. A VFOEA can also shape wave fronts and move image planes by dynamically controlling surface deformations at each point of the array. In most cases, the modifying effects of a VFOEA 625 on a large impinging beam, say 3 mm, is the summation of the individual effects of the much smaller diameter VFOEs. A VFOEA 625 can take the form of a revolved approximately conic section reflector, a hemisphere, a convex reflector, a flat surface or any other shape.

Figure 20:
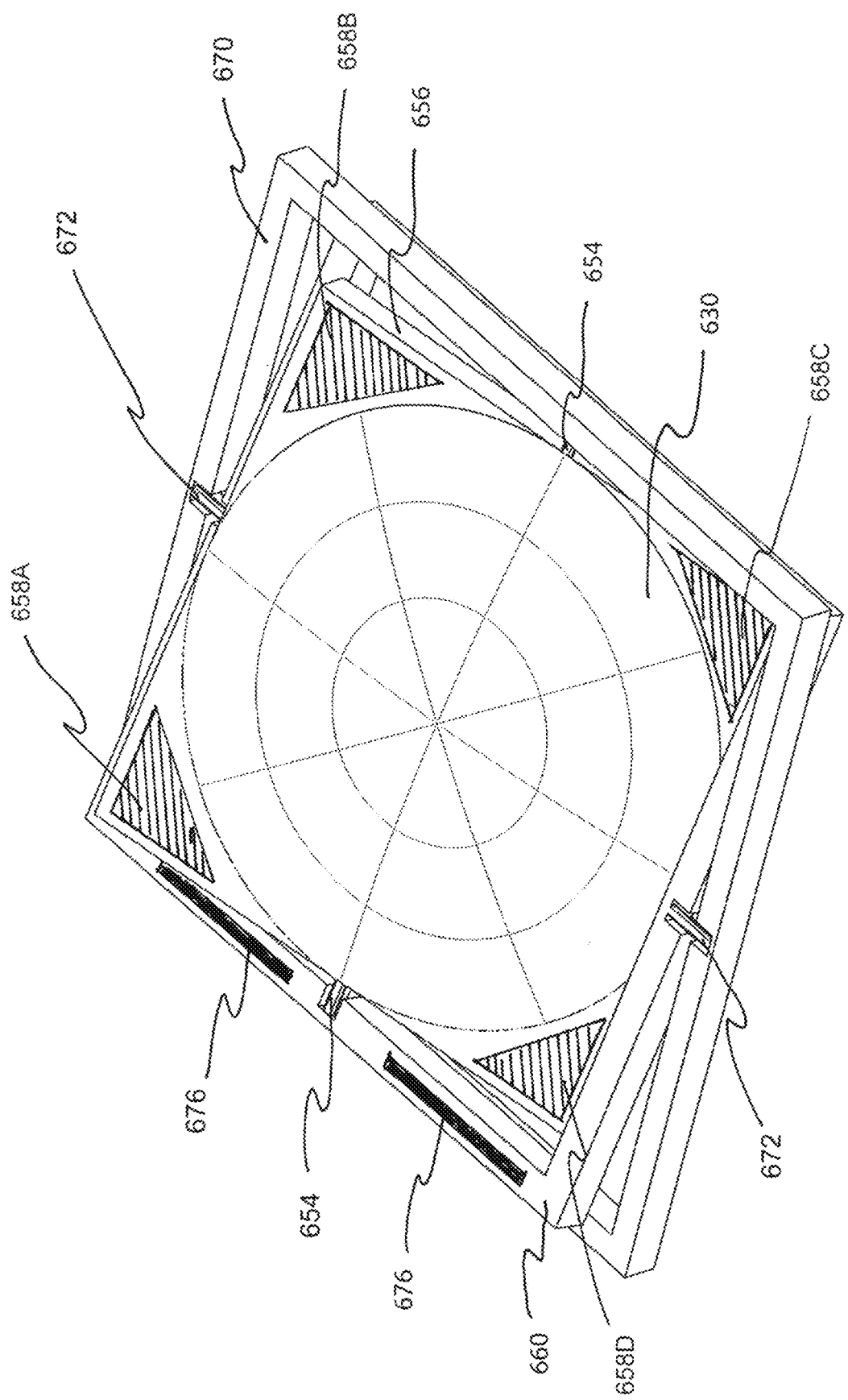

FIG. 20 shows a steerable Variable Focus Optical Element 656 in a double gimbaled configuration. In one embodiment, VFOE 656 provides similar optical functions as VFOE 615, and is configured to be suspended in a frame constrained by torsional gimbal bearing pair 654 and 672. Each gimbal torsion bearing pair restrains vertical movements while permitting rotations with a single DOF. Conductive lines, not shown, providing electrical communication to actuator pads 658A, 658B, 658C, 658D from the outside world, as well as electrical communication to optical surface 630, are in contact with, and pass over these gimbal bearings. In this example, the optical surface 630 has been activated to a convex state.

Actuator pads 658A, 658B, 658C, and 658D are arranged on the four surface corners of VFOE 656 to provide unbalanced actuation forces that can move VFOE 656 with two DOF about the rotation axes defined by torsional gimbal bearing pair 654 and 672. If acting in pairs, actuator pads 658A and 658B can counter or enhance the rotation forces produced by actuator pads 658C and 658D causing a pure rotation about an axis defined by gimbal bearing pair 654.

An outer gimbaled frame 660, holds VFOE 656, and permits rotation about the axis defined by gimbal bearing pair 654. A fixed outside frame 670, permits rotation of outer gimbaled frame 660 about a second axis of rotation that is substantially orthogonal to the first, and defined by gimbal bearing pair 672. All electrical paths can travel over or upon this second set of gimbal bearing pairs 672. Actuator pads 676 (lower pads not shown due to obscuration) may provide electrostatic forces for rotating VFOE 656 to a selected angle about the axis of gimbal bearing pair 672.

It can be appreciated that any number of alternate configurations for torsional bearings, optical surfaces, actuator elements, communication traces, and material compositions of the components may be substituted without altering the overall function of this or any other gimbaled embodiment. In another embodiment, VFOE 656 could be in a single gimbal configuration. It can also be appreciated that an optical element with a fixed, predefined surface shape could also replace the VFOE, resulting in a steerable element with a fixed focus. And as before, magnetic, thermal bimorph, thermal expansion, local optical heating, piezoelectric, shape memory deformation or any other method for imparting a force can be an equivalent substitute for imparting angular or linear displacements for a steerable optical element.

Figure 21:
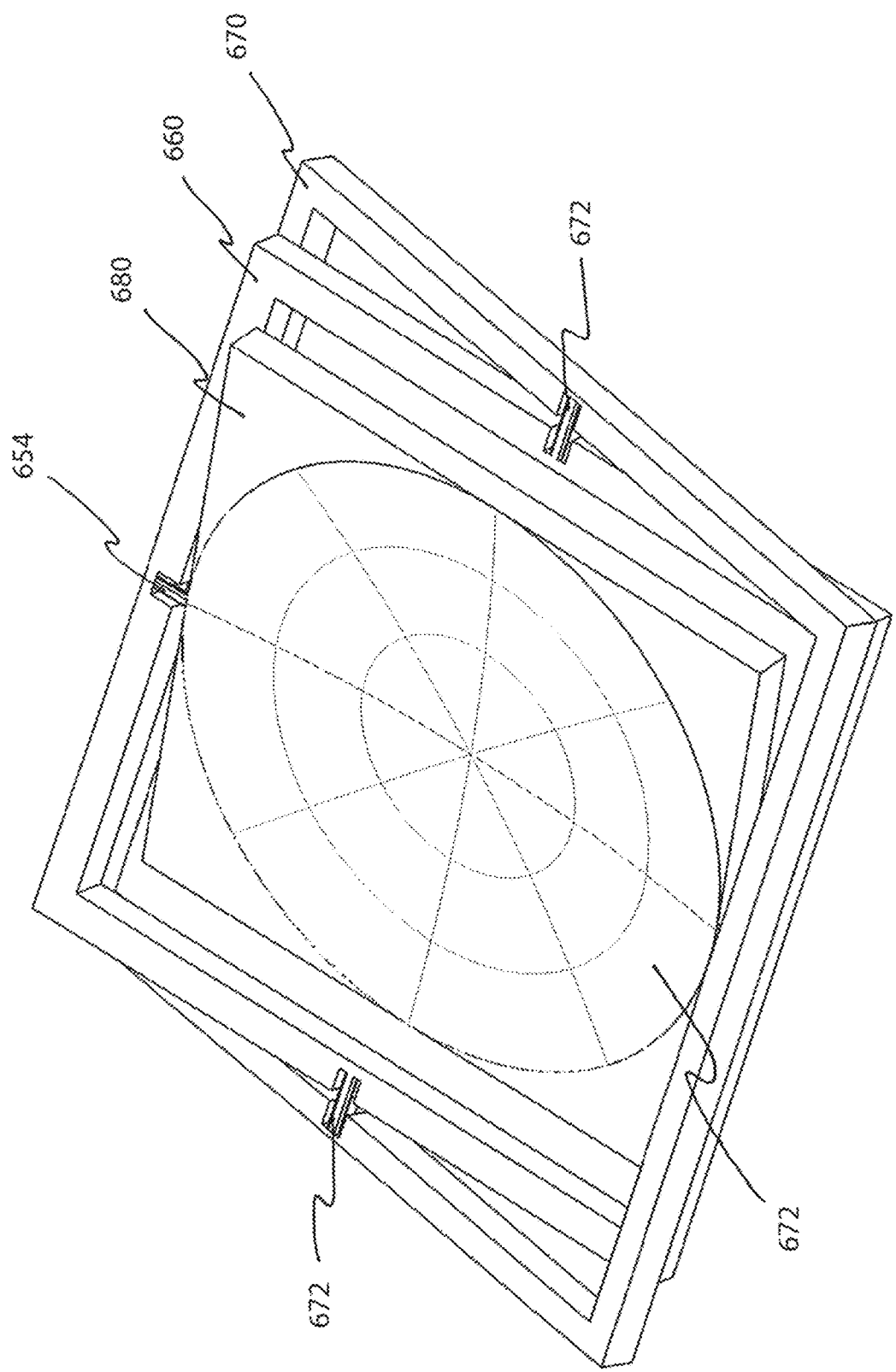

FIG. 21 shows a steerable Variable Focus Optical Element 680 in a double gimbaled configuration, similar to the discussion of FIG. 20, but with VFOE 680 having surface 630 in a concave state. In this embodiment, VFOE 680 is constrained by torsional gimbal bearing pair 654 to outer gimbaled frame 660. And outer gimbaled frame 660 is constrained by torsional gimbal bearing pair 672 to an externally fixed outside frame 670. Rotation axes, communication lines, actuator pads, alternative configurations, and alternative force producing methods are similar to the discussions of FIG. 20. It can be appreciated by those skilled in the art that the type of bearings, the number of bearings, the number of DOF motions, the location of their axes, the directions of rotation, the type, location, and the external shape of the components themselves may take many different, but equivalent physical forms without altering the overall function of this or any other gimbaled embodiment.

It can also be appreciated that a half ball micro lens or a vertical GRIN lens, or any other refracting lens could be fabricated or attached to a mirrored surface thereby providing steerable focusing or defocusing power as well.

Figure 22:
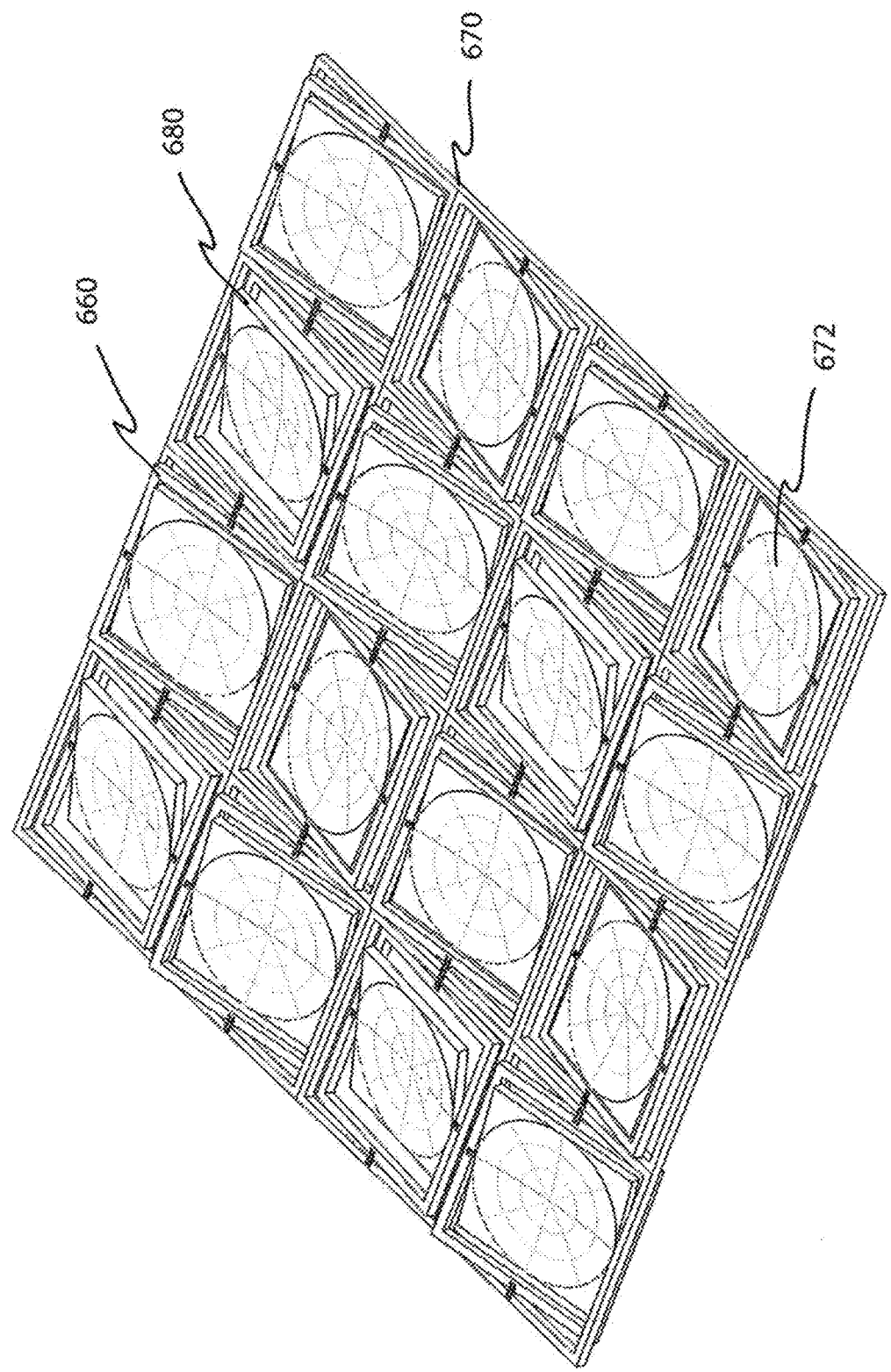

FIG. 22 shows a small portion of an array of steerable Variable Focus Optical Elements 680 in a concave state and at various angular positions. In one embodiment, a full array may be formed as a contiguous flexible sheet that may be bonded to, or be formed into the shape of, reflector 442, or any other useful shape. In another embodiment, an array might be created by joining individual steerable VFOEs 680, or groups of steerable VFOEs 680 together, then bonding them to a surface. In yet another embodiment, one or more individual steerable VFOEs 680 may also be directly bonded to a surface such as reflector 442, without requiring immediate contact with one another.

In one particular array embodiment, individual steerable VFOEs 680, may control their surface contours individually or as a synchronized group. In yet another embodiment, steerable VFOEs 680 can be replaced with steerable, fixed curvature optical elements 673 having predetermined contours. In yet another embodiment, a combination of steerable VFOE's 680 and steerable static curvature optical elements 673 may populate a steerable array. Each individual steerable VFOE 680 within the array of FIG. 22, may be configured for single DOF motion, two or more DOF motions, or a combination of single DOF motion and two or more DOF motions.

A concave reflector profile is advantageous for the reflection of small diameter laser beams, as unavoidable divergence due to diffraction is inversely proportional to beam diameter and can be maintained with positive focusing elements, allowing for a small spot size at close distances.

The average size of a photoreceptor is approximately 6 microns. For 20/20 vision, the smallest angle of resolution is approximately 60 arc seconds. Therefore, if 20/20 resolving power is the goal, then a 2.5 mm diameter beam, for example, should be collimated to approximately one degree of divergence to form a 5 micron diameter spot on the retina with a crystalline lens 408 effective focal length of approximately 17 mm. The angle subtended from a point 6 inches distant from a 2.5 mm diameter pupil is approximately 1 degree.

Figure 23:
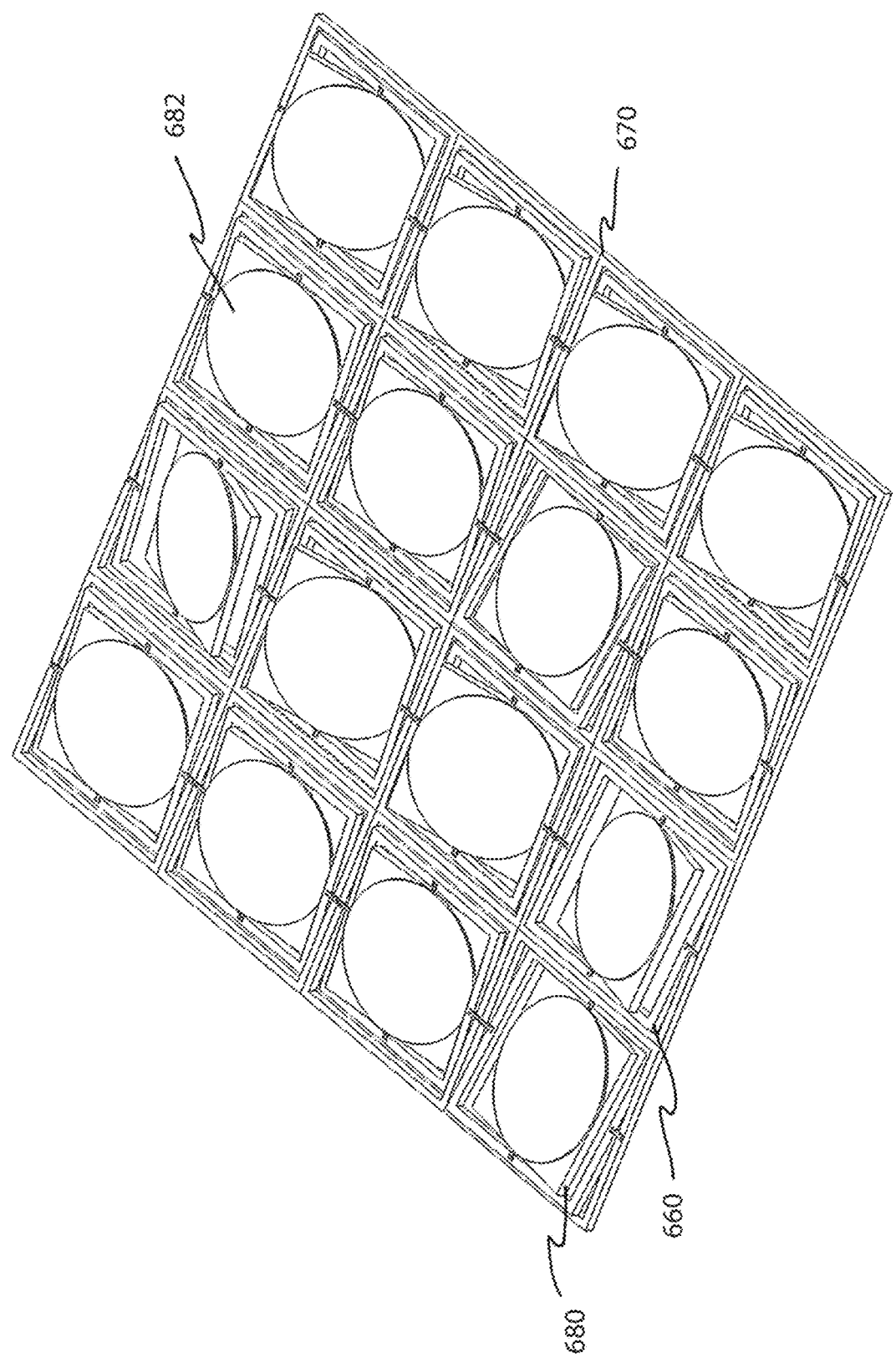

FIG. 23 shows one embodiment for a double gimbaled, flat optical element array. Features, operations, and alternate embodiments are similar to the arrays and their components previously discussed. In one embodiment, the optical surface 682 of all beam steering optical elements 680 are in a flat state. This can be achieved by the dynamic control of a VFOE or by the use of a statically defined flat surface. Outside frame 670 is fixed with respect to movable outer gimbaled frame 660, and optical element 680 can move with respect to outer gimbaled frame 660. A flat mirror state can be quite useful in a reflector array designed for dynamic focusing of portions of the total reflector surface as described in FIG. 15. Of course, beam steering optical element 680 can be of any external shape including rectangular or square.

The optical surface 682, can also take the form of a simple micromirror, a dynamic VFOE, a multidielectric stack, a metamaterial, a static or dynamically controlled optical grating array, a static convex or concave optical element, or any other optical element that can transmit, absorb, polarize, upconvert, downconvert, lase, emit, refract or reflect electromagnetic radiation in any way. In addition, the method of action should not be limited to electrostatic forces exclusively. Magnetic, thermal bimorph, thermal expansion, local optical heating, piezoelectric, shape memory deformation or a host of other forces could also be substituted to provide angular or linear displacement in a similar fashion.

Figure 24:
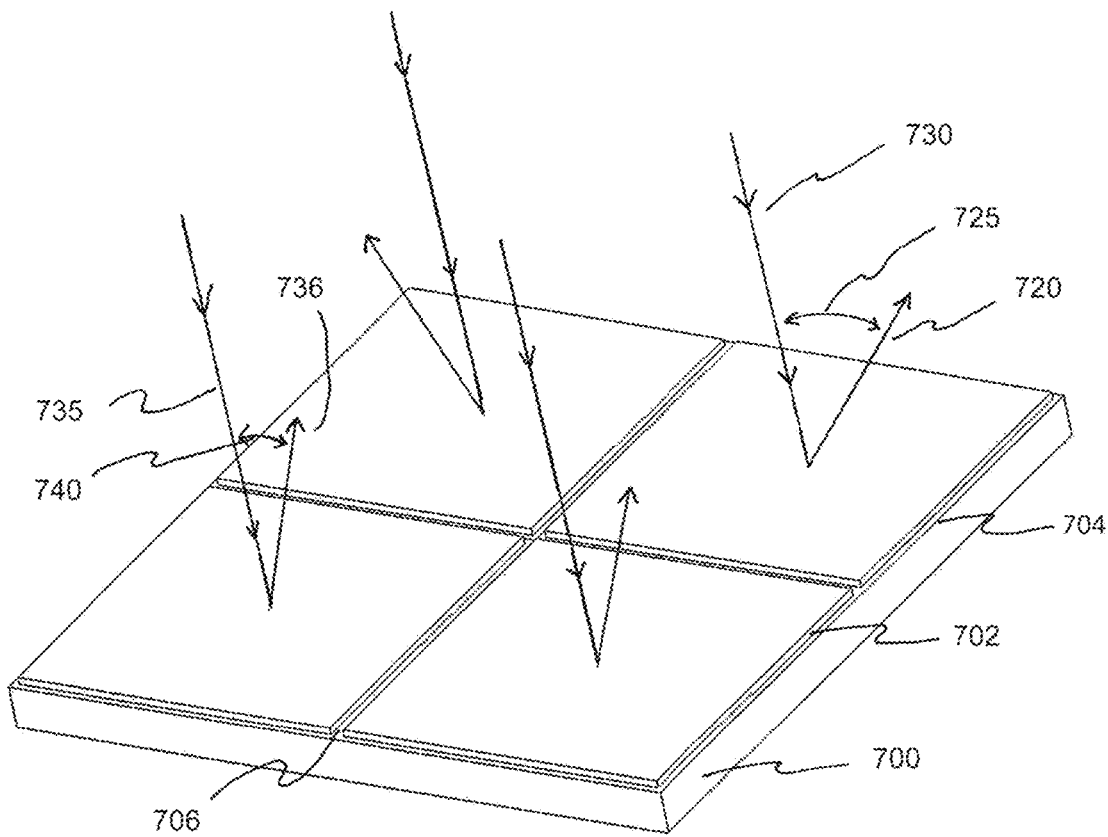

FIG. 24 shows one possible configuration for a small array of metamaterial reflectors. Metamaterials have shown a promising potential for having the ability to vary n, a measure of their refractive coefficients for electromagnetic radiation. In the right configuration, beam 735, incident on a beam steering metamaterial reflector 702, can be electronically reflected by an angle 740, resulting in beam 736 at one potential while incident beam 730 can be electronically reflected by a different angle 725, resulting in beam 720 at a different potential, on a different plate. The simple configuration shown consists of an engineered thin film nanostructure that can be made to alter the index of refraction at will. In this one embodiment, small pads of index changing metamaterial reflector 702 are fabricated on substrate 700 and may be isolated from one another by trenches 706. Each metamaterial reflector 702 may be controlled by individually addressable control plates 704 positioned beneath each metamaterial reflector 702 and upon substrate 700. Other equivalent embodiments of metamaterial reflectors, control plates, electrical connections and substrates can take any shape, or any curvature, and can be created from many different materials without deviating from the scope or functions as described.

Figure 25:
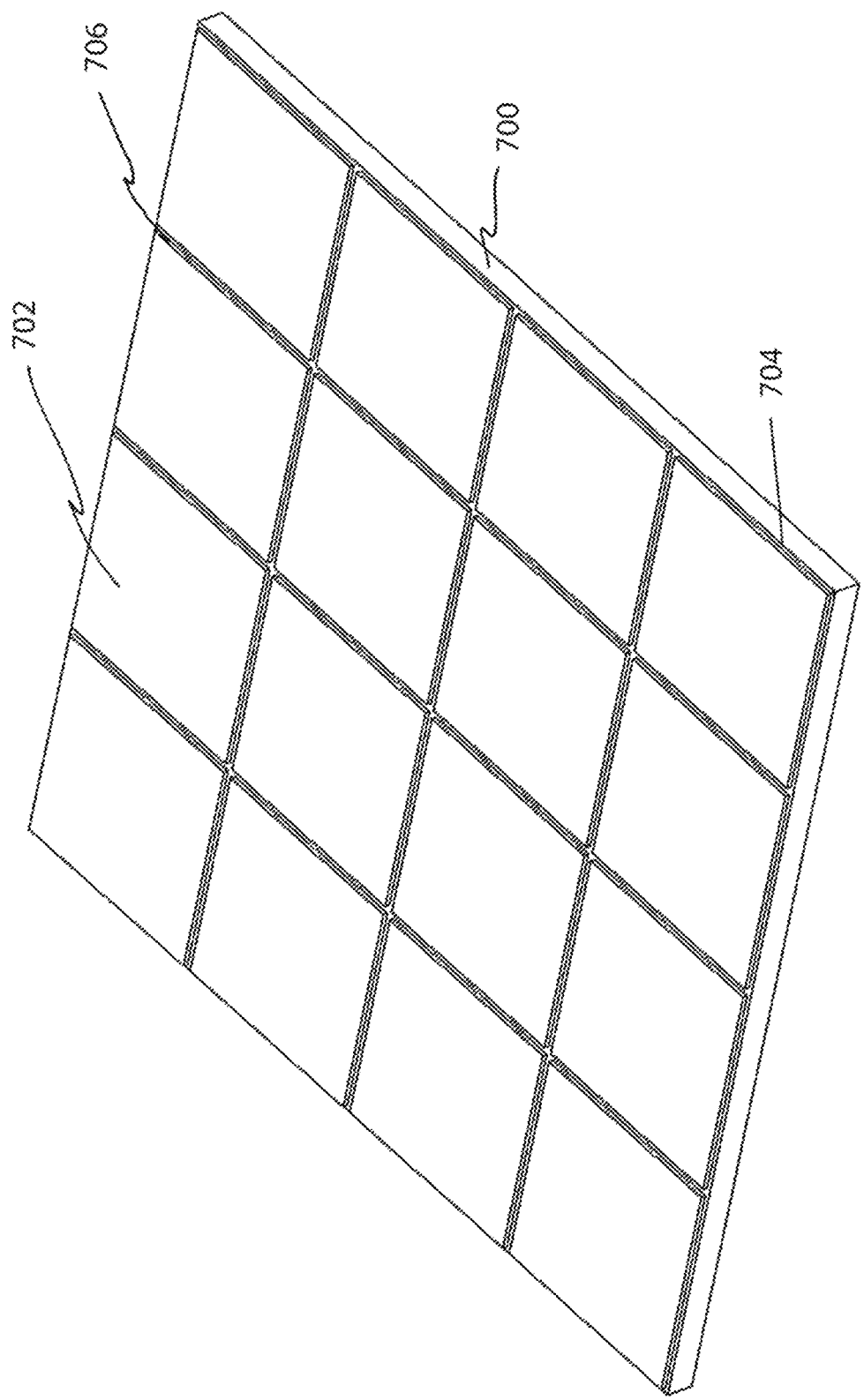

FIG. 25 shows one embodiment of a larger array of metamaterial reflectors 702 disposed on substrate 700 and lying over control plates 704. The array can be made sufficiently large to accommodate a large visual field with high acuity. The upper limit of beam deflecting elements could be larger than the total number of photoreceptors in the human eye, or 15 million Substrate 700 may take any 3D curved form, such as a revolved approximately conic section, to provide the beam forming properties as described in the FIG. 15 discussion and represented by adaptive reflector array 575. Other equivalent embodiments are as described in the FIG. 24 discussion.

Figure 26:
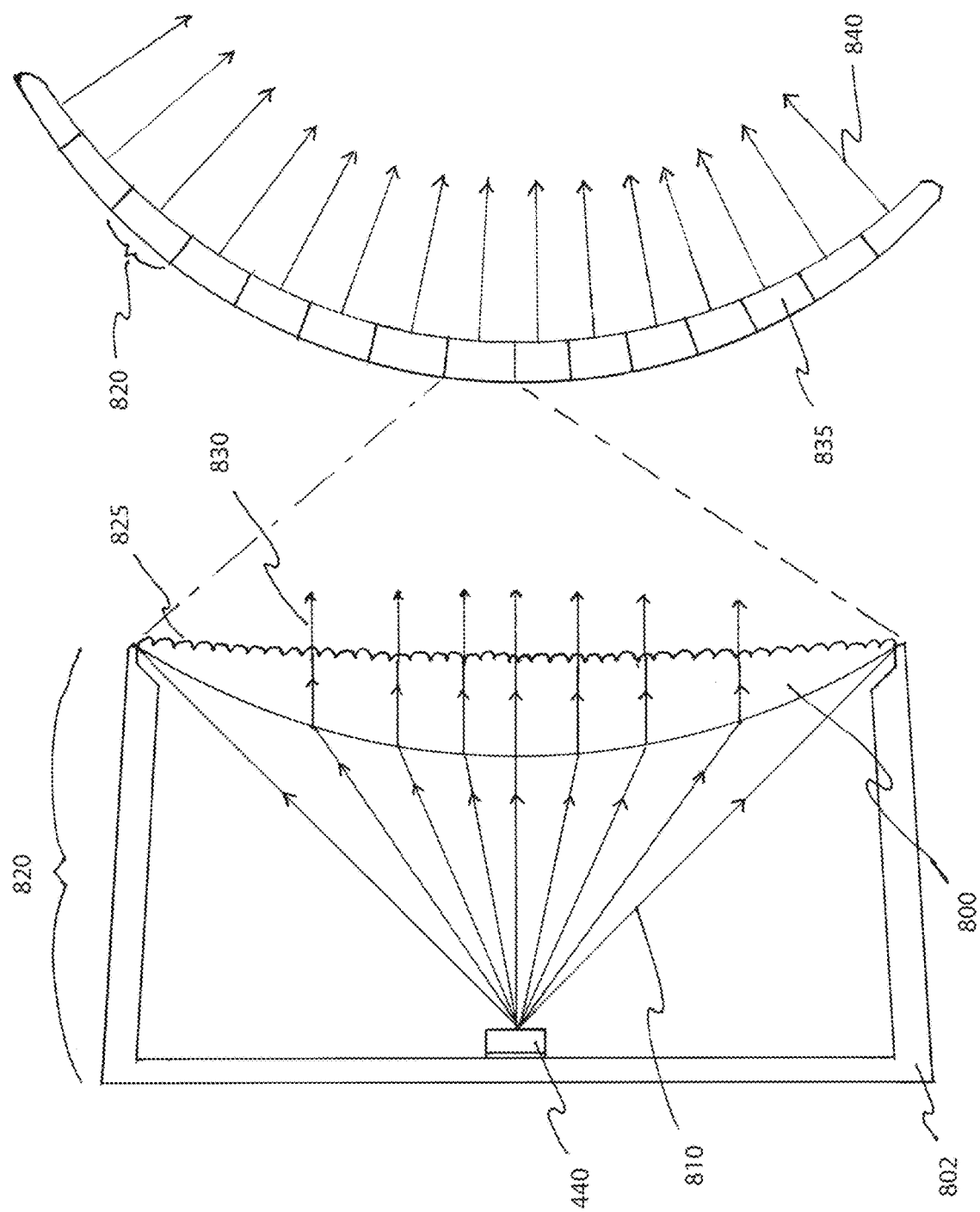

FIG. 26 shows a breakout view of one embodiment of a single Micro Scanner Direct Projection Optical Element 820. Also shown is vertical column 835 of concatenated MSDPOEs 820. In this view, MSDPOE 820 includes a light isolation housing 802 that provides optical isolation from neighboring MSDPOEs, and supports a projection optical element 800, and a scanning projector 440. Electrical and optical signal pathways (not shown), may convey signals to internal components through the walls of light isolation housing 802. Projection optical element 800 having a corrective first surface nearest scanning projector 440 and an optional micro lens modified second surface nearest the eye 460, may be hermetically sealed to light isolation housing 802 in one embodiment.

Similar to the discussion of FIG. 18 with respect to adaptive reflector array 575, a multitude of vertical columns 835, can be joined side-by-side such that a compound curved screen may be created that can provide a close proximity, full immersion projection field. In one embodiment, the compound curved screen may be similar in shape to reflector 442. It can be appreciated that an arrayed configuration of MSDPOEs 820, can take any shape, and may incorporate any number of MSDPOEs 820 of any size.

In one possible embodiment, a MSDPOE array may operate in the following manner Light beams of controllable divergence 810, are emitted by scanning projector 440. These beams then strike the corrective first surface of projection optical element 800 and are refracted to a more convergent state. The beams then exit the second refractive surface of projection optical element 800, and may be further refined by an optional micro lens array 825, such that the vergence of each exit beam 830, may be modified further before striking the retina.

Each MSDPOE can be rigidly affixed to its neighbor in a way that orients all exit beam axes 840 to intercept the cornea at the proper angle, thereby producing a properly immersive projection directly onto the retina.

It may be noted, that exit beam axis 840 is approximately normal to the exit surface of projection optical element 800 and may not depart at the proper angle for all simulated visual field conditions. To correct for this possible situation, one might further employ an array of steerable flat optical elements 682 as shown in FIG. 23. In this implementation, one might simply replace the flat reflectors 682 supported in the double gimbaled frame 660 with micro lenses. A modified field, and improved exit beam direction might then be achieved by introducing this refractive beam steering array in place of the micro lens array 825.

It can be appreciated that MSDPOE 820 could be comprised of any combination of refractive or reflective elements being of active or passive design, and having a variety of shapes and sizes without limiting the scope or purpose of the described functions.

For instance, in another embodiment, scanning projector 440 could be relocated from the back wall of light isolation housing 802 to the first surface of projection optical element 800. The back wall of light isolation housing 802 might then be modified to take the form, for example, of a revolved approximately conic section reflector. Beams of controllable divergence 810 would then reflect off of this surface and pass through the first surface of projection optical element 800 in an optical path somewhat analogous to FIG. 12. And in yet another embodiment, by combining this configuration with the refractive beam steering array described above, one could provide a compact, MSDPOE 820 with a near ideal vergence and exit angle for any exit beam 830.

In yet another embodiment of the device shown in FIG. 26, vertical columns 835 may be joined side-by-side to form an approximately planar display screen. By increasing, or otherwise altering the total scan angle of each MSDPOE 820 with respect to its optical axis, an active projection screen may be created for far field observation by one or more viewers. And if each projector picture element, or "proxel", is provided with a controllable vergence modulator as previously described, then the resulting projection screen may allow audiences to see a highly realistic, controllable depth of field scene that may extend beyond the perceived confines of the stage and theater. Other beam modulators controlling amplitude, polarization state, wavelength composition, etc. may also be employed to enhance perceived realism.

Figure 27:
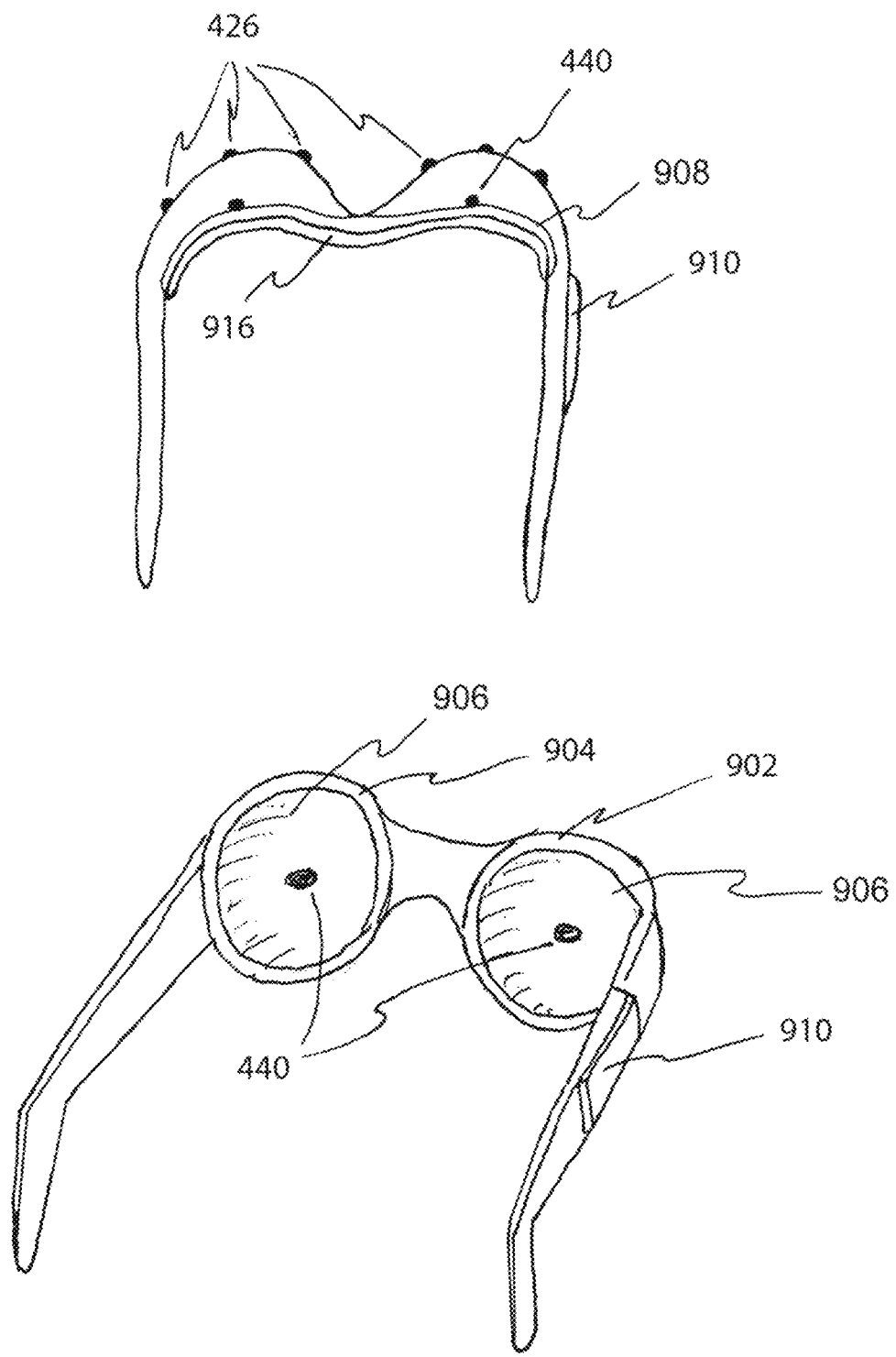

FIG. 27 shows a top view of one possible configuration for system integrating glasses 900 in the upper area, an isometric view of the glasses in the bottom part of the Figure, and a cross sectional view of a right lens in the upper right area.

The scanning projectors 440 are shown for each of the left and right eyes. The scanned beams may reflect off any variety of reflector surfaces 906, described herein. A comfortable light isolation shield 916 could be replaceable and perhaps custom fit for each individual, incorporating a breathable, light baffle design. If needed, eye tracking cameras 902, placed on an angular ring could be provided to view the pupil in the usual way. The eye tracking cameras 902 could also be placed on each reflector surface 906 if small enough to not be intrusive. Outward looking cameras 426 are shown, and if properly distributed on the outer surface and of high enough resolution, could provide video input to the wearer that would emulate what one would see if not wearing the glasses. This view could also be combined with purely synthetic images to give a sense of augmented reality, or a pure virtual view without camera data. Corrective lens 908 also provides support for scanning projectors 440. To complete the full immersion effect, one or more speakers 905 in the form of earbuds, for example, could be employed.

The integrated system may include frames, scanning projectors 440, data processors, power, and communications modules. In another embodiment, data processing, power, and communications functions could be combined into a single hybrid module 910 that can be either on or off the frames. In other embodiments, additional system components might include, but are not limited to, a reflector body 442, outward looking cameras 426, inward looking cameras or eye tracking cameras, external displays, radio transmitters, IR transmitters, speakers, microphones, refracting optics, reflecting optics, corrective lens 908, waveguides, fiber optic components, micro optic components, light sources, optical filters, software, and sensors 903 to detect motion, position, location, GPS signals, environmental conditions, humidity, temperature, wind speed, radio signals, pressure, tactile information, magnetic fields, heat, sound, visible light, UV, IR, ionizing radiation, radioactivity, or any other quantity that can be sensed, observed or measured.

Weight and costs may be reduced by moving many functions off frame. For example, cloud based computations could be wirelessly transmitted to onboard electro optical, communications and power modules. Power could also be delivered wirelessly through induction. Or all support functions could be moved off frame wherein a fiber optic and wire cable might carry electrical and visual data directly to the projectors.

For improved social acceptance, an external view of one's eyes through each lens, as perceived by a passerby could be achieved by, in one embodiment, acquiring images of the wearers eyes with inward facing cameras and displaying them on a LCD, LED, OLED, or any other type of display placed external surface 920.

It can be appreciated by those skilled in the art that there are limitless combinations of the systems, sub-systems and components described herein, that may be equivalent in their ability to deliver an integrated, visually immersive, audio immersive, photoreceptor density limiting, wide angle, full spectrum, binocular, real optical depth of field, imaging system at a high level of complexity and cost, to an integrated, visually immersive system at a lower level of complexity and cost.

Although the above descriptions contain much specificity, this should not be construed as limitations on the scope and spirit, but rather as an exemplification of several embodiments thereof. Many other variations are possible and modifications of the embodiments will occur to those skilled in the art. Accordingly, the scope should be determined not by the embodiments illustrated, but by the appended claims and their legal equivalents.

I claim:

1. An immersive optical projection device comprising:
a frame;
at least one projector array comprising
at least one image projection device;
at least one light source, wherein said light source is coupled to said projector array;
a reflector,
wherein said reflector is coupled to said frame; and
a projector array support,
wherein said at least one projector array is coupled to said projector array support and said projector array support is coupled to said frame,
such that a beam of light produced by said at least one light source is directed to said at least one image projection device, and said at least one image projection device controllably emits a luminous image, in at least one dimension, that further proceeds towards said reflector, whereupon, said reflector redirects said luminous image into an observer's eye.

2. The immersive optical projection device of claim 1 wherein said at least one image projection device is a scanning sub-projector configured to controllably steer said at least one beam of light with at least one degree of freedom.

3. The immersive optical projection device of claim 1 further comprising at least one beam modulator placed in an optical path between said at least one light source and said observer's eye, such that the amplitude, polarization state, wavelength, or degree of vergence of said beam of light impinging on said at least one beam modulator is selectively altered and further proceeds along said optical path.

4. The immersive optical projection device of claim 1 further comprising at least one observation channel.

5. The immersive optical projection device of claim 1 wherein said at least one image projection device is a multi-degree of freedom beam steering device.

6. The immersive optical projection device of claim 1 wherein said at least one projector array is a scanning projector.

7. The immersive optical projection device of claim 1 wherein said reflector is a revolved conic section having at least a partially reflective surface or a revolved asphere having at least a partially reflective surface.

8. The immersive optical projection device of claim 1 wherein said reflector is a refractive element having an at least partially reflective distal surface and a substantially transparent proximal surface such that said at least one beam of light passing through said refractive element and reflecting off said at least partially reflective distal surface is further directed towards said substantially transparent proximal surface and into said observer's eye.

9. The immersive optical projection device of claim 1 further comprising at least one integrated system module, wherein said at least one integrated system module is a data processor module, a power module, a wired communications module, a wireless communications module, an electro optical module, an inertial sensor module, a position sensor module, a speaker module, a camera module, or an eye tracking module, and said at least one integrated system module is coupled to said frame.

10. The immersive optical projection device of claim 1 further comprising:
at least one outward looking camera; and
at least one motion sensor,
wherein said at least one outward looking camera is affixed to a distal surface of said reflector and said at least one motion sensor is affixed to said frame.

11. The immersive optical projection device of claim 1 further comprising an array of individually controllable micromirrors disposed on a proximal surface of said reflector nearest said observer's eye, wherein each individually controllable micromirror of said array is configured to selectively control the angle of reflection of an impinging said beam of light.

12. The immersive optical projection device of claim 1 further comprising at least one said image projection device coupled to said frame such that said at least one image projection device controllably emits said luminous image, in at least one dimension, that further proceeds into said observer's eye.

13. The immersive optical projection device of claim 1 wherein said projector array support is a refractive corrector lens that is sealed against said reflector, thereby forming a sealed cavity protective of said reflector and said projector array, wherein said projector array is coupled to said refractive corrector lens and within said sealed cavity.

14. The immersive optical projection device of claim 1 further comprising a variable focus optical element array disposed on a proximal surface of said reflector nearest to said observer's eye, wherein each variable focus optical element of said variable focus optical element array is configured to control the vergence of an impinging beam of light.

15. An immersive optical projection device comprising:
a frame;
at least one scanning projector, wherein said at least one scanning projector is further comprised of at least one multi-degree of freedom steerable micromirror;
at least one light source, wherein said light source is coupled to said scanning projector;
a revolved conic section reflector surface or aspheric reflector surface;
an array of individually controllable micromirrors, wherein said array of individually controllable micromirrors is disposed on said revolved conic section reflector surface or said aspheric reflector surface; and a refractive element coupled to said frame,
wherein said refractive element is sealed against said revolved conic section reflector surface or said aspheric reflector surface, thereby forming a sealed cavity protective of said revolved conic section reflector surface, or said aspheric reflector surface and said at least one scanning projector,
wherein said at least one scanning projector is coupled to said refractive element and within said sealed cavity,
such that a beam of light produced by said at least one light source is directed to said at least one multi-degree of freedom steerable micromirror, and said at least one multi-degree of freedom steerable micromirror controllably emits a luminous image, in at least one dimension, that further proceeds towards said array of individually controllable micromirrors, and is further directed through said refractive element into an observer's eye.

16. An immersive optical projection device comprising:
    a support structure;
    at least one micro scanner direct projection optical element comprising:
        at least one light source;
        at least one multi-dimensional image projection device; and
        a projection optical element,
wherein said at least one multi-dimensional image projection device is coupled to said support structure,
and said at least one light source, said at least one multi-dimensional image projection device and said projection optical element are coupled with respect to one another such that a beam of light produced by said at least one light source is directed to said at least one multi-dimensional image projection device, and said at least one multi-dimensional image projection device controllably emits a luminous image in at least one dimension, that further proceeds through said projection optical element, whereupon said luminous image is projected towards an observer's eye.

17. The immersive optical projection device of claim 16 further comprising:
    a light isolation housing,
    wherein said at least one multi-dimensional image projection device is affixed to an interior wall of said light isolation housing and said projection optical element is sealed against an opposing open side of said light isolation housing, such that a sealed cavity protective of said at least one multi-dimensional image projection device and one side of said projection optical element is formed,
    such that said luminous image emitted by said at least one multi-dimensional image projection device passes through said projection optical element and away from said light isolation housing towards said observer's eye.

18. The immersive optical projection device of claim 16 wherein said at least one multi-dimensional image projection device is a scanning projector that can steer said beam of light with at least one degree of freedom.

19. The immersive optical projection device of claim 16 further comprising at least one beam modulator placed in an optical path between said light source and said observer's eye, such that the amplitude, polarization state, wavelength, or degree of vergence of said beam of light impinging on said at least one beam modulator is selectively altered and further proceeds along said optical path.

20. The immersive optical projection device of claim 16 wherein said at least one micro scanner direct projection optical element comprises a plurality of micro scanner direct projection optical elements arrayed in two dimensions on surface of said support structure such that a screen of sufficient size is created for direct viewing by one or more observers.

* * * * *